US009749080B2

(12) United States Patent
Lam et al.

(10) Patent No.: US 9,749,080 B2
(45) Date of Patent: Aug. 29, 2017

(54) TWDM PASSIVE NETWORK WITH EXTENDED REACH AND CAPACITY

(71) Applicant: Google Inc., Mountain View, CA (US)

(72) Inventors: Cedric Fung Lam, Belmont, CA (US); Liang Du, San Clara, CA (US); Changhong Joy Jiang, Dublin, CA (US); Ben Warren Segura, Morgan Hill, CA (US); Xiangjun Zhao, Fremont, CA (US); Daoyi Wang, San Jose, CA (US)

(73) Assignee: Google Inc., Mountain View, CA (US)

( * ) Notice: Subject to any disclaimer, the term of this patent is extended or adjusted under 35 U.S.C. 154(b) by 9 days.

(21) Appl. No.: 14/938,146

(22) Filed: Nov. 11, 2015

(65) Prior Publication Data

US 2017/0134113 A1   May 11, 2017

(51) Int. Cl.
*H04J 14/00* (2006.01)
*H04J 14/02* (2006.01)
(Continued)

(52) U.S. Cl.
CPC ...... *H04J 14/0247* (2013.01); *H04B 10/2503* (2013.01); *H04J 14/0221* (2013.01);
(Continued)

(58) Field of Classification Search
None
See application file for complete search history.

(56) References Cited

U.S. PATENT DOCUMENTS 7,155,127 B2 * 12/2006 Akimoto ............... H04B 10/40
                                                                385/24
7,245,829 B1 *  7/2007 Sindile ............... H04J 14/0227
                                                                398/45
(Continued)

FOREIGN PATENT DOCUMENTS

WO   WO-2007092361 A2   8/2007
WO   WO-2014163752 A2   10/2014
WO   WO-2015044036 A1   4/2015

OTHER PUBLICATIONS

Scholts et al: "Tunable Thin Film Filters for the Next Generation PON Stage 2 (NG-PON2)", ELEKTRO, May 19-20, 2014, pp. 98-102.*

(Continued)

*Primary Examiner* — Li Liu
(74) *Attorney, Agent, or Firm* — Honigman Miller Schwartz and Cohn LLP

(57) ABSTRACT

A communication system includes a first multiplexer configured to multiplex a first optical line terminal signal having a first multiplexing group and a second optical line terminal signal having a second multiplexing group into a first multiplexed signal. The communication system includes a second multiplexer configured to demultiplex a second multiplexed signal into a third optical line terminal signal having the first multiplexing group and a fourth optical line terminal signal having the second multiplexing group. Moreover, the communication system includes a third multiplexer optically connected with the first multiplexer and the second multiplexer, the third multiplexer configured to multiplex/demultiplex between a feeder optical signal and the first and second multiplexed signals. The first and second optical line terminal signals include a legacy upstream free spectral range, and the third and fourth optical line terminal signals include a legacy downstream free spectral range.

12 Claims, 18 Drawing Sheets

(51) Int. Cl.
*H04B 10/25* (2013.01)
*H04J 14/08* (2006.01)

(52) U.S. Cl.
CPC ...... *H04J 14/0223* (2013.01); *H04J 14/0242* (2013.01); *H04J 14/0265* (2013.01); *H04J 14/0282* (2013.01); *H04J 14/08* (2013.01)

(56) References Cited

U.S. PATENT DOCUMENTS

| | | | | |
|---|---|---|---|---|
| 7,555,215 | B2* | 6/2009 | Nakamura | H04J 14/0226 398/20 |
| 7,773,838 | B2* | 8/2010 | Lee | H04J 14/0226 385/15 |
| 8,055,133 | B2* | 11/2011 | Lee | H04J 14/0226 398/67 |
| 8,320,760 | B1* | 11/2012 | Lam | H04J 14/002 398/66 |
| 9,294,192 | B2* | 3/2016 | Eiselt | H04B 10/2575 |
| 9,332,323 | B2* | 5/2016 | Zhang | H04Q 11/0005 |
| 2003/0039010 | A1* | 2/2003 | Akimoto | H04B 10/40 398/139 |
| 2004/0184806 | A1* | 9/2004 | Lee | H04H 20/42 398/79 |
| 2006/0062576 | A1* | 3/2006 | Nakamura | H04J 14/0226 398/72 |
| 2006/0093360 | A1* | 5/2006 | Kim | H04B 10/2587 398/71 |
| 2008/0304830 | A1* | 12/2008 | Huang | H04J 14/0226 398/79 |
| 2009/0154924 | A1 | 6/2009 | Liu et al. | |
| 2010/0239258 | A1* | 9/2010 | Calabretta | H04B 10/677 398/70 |
| 2011/0222855 | A1* | 9/2011 | Kim | H04J 14/0282 398/79 |
| 2012/0177371 | A1* | 7/2012 | Lee | H04J 14/0226 398/63 |
| 2013/0039656 | A1 | 2/2013 | Lam et al. | |
| 2013/0209105 | A1* | 8/2013 | Jeong | H04J 14/0282 398/72 |
| 2013/0223841 | A1* | 8/2013 | Lee | H04J 14/0232 398/72 |
| 2014/0161446 | A1 | 6/2014 | Lee et al. | |
| 2014/0233954 | A1* | 8/2014 | Lee | H04J 14/0246 398/72 |
| 2014/0314414 | A1* | 10/2014 | Cheng | H04J 14/02 398/68 |
| 2014/0341574 | A1 | 11/2014 | Yan | |
| 2015/0030334 | A1* | 1/2015 | Eiselt | H04B 10/2575 398/79 |
| 2015/0055955 | A1 | 2/2015 | Kim et al. | |
| 2015/0139651 | A1 | 5/2015 | Xuejin et al. | |
| 2015/0163011 | A1 | 6/2015 | Lee | |
| 2015/0229429 | A1* | 8/2015 | Luo | H04J 14/02 398/79 |
| 2016/0020868 | A1* | 1/2016 | Lee | H04J 14/023 398/58 |
| 2016/0197697 | A1* | 7/2016 | Bonk | H04B 10/27 398/58 |
| 2016/0329984 | A1* | 11/2016 | Rafel Porti | H04J 14/0246 |

OTHER PUBLICATIONS

Pohlmann et al: "Low Cost TWDM by Wavelength-Set Division Multiplexing", Bell Labs Technical Journal 18(3), Dec. 2013, pp. 173-193.*

Andrade et al: "Evaluating Strategies for Evolution of Passive Optical networks", IEEE Communications Magazine, vol. 49, Issue: 7, Jun. 30, 2011, pp. 176-184.*

International Search Report and Written Opinion for Application No. CT/US2016/058378 dated Jan. 12, 2017.

European Extended Search Report for related Application No. 16197732.7 dated Mar. 14, 2017.

* cited by examiner

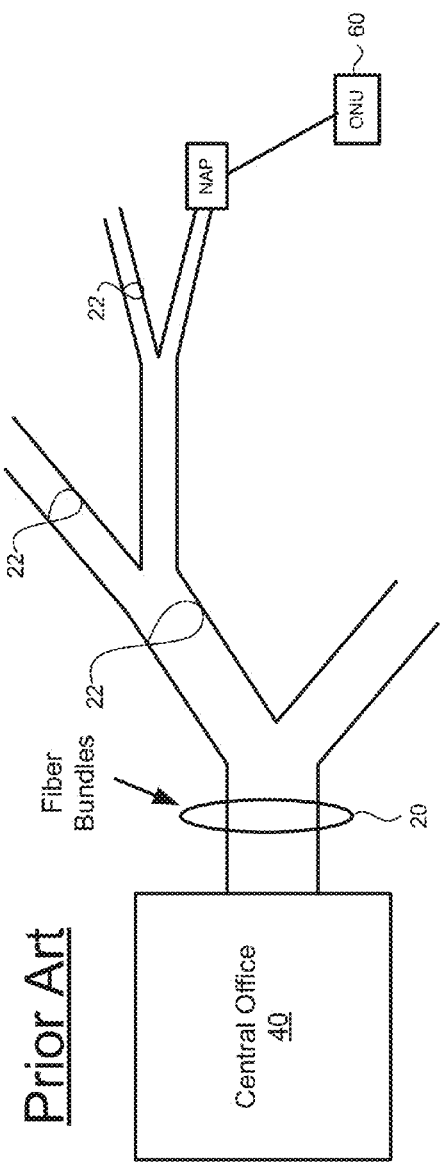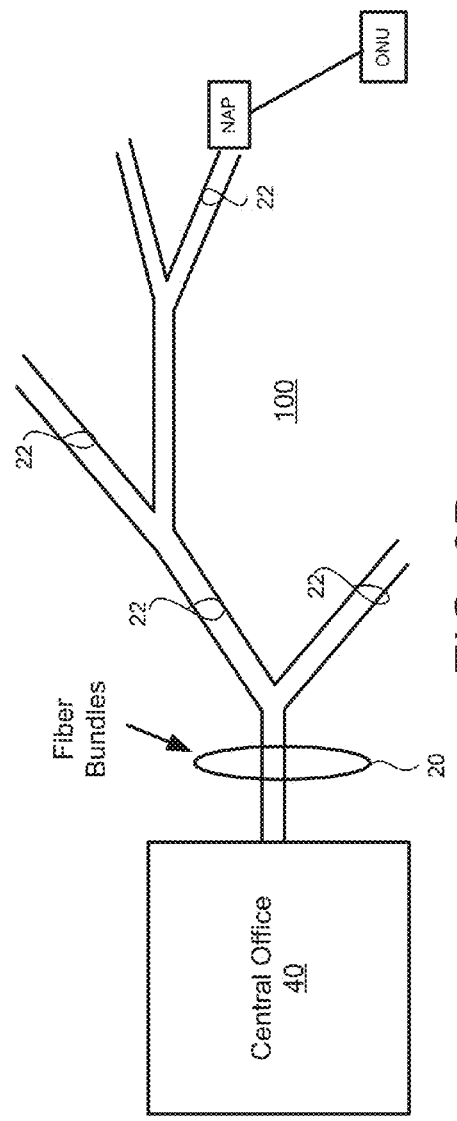

TWDM PASSIVE NETWORK WITH EXTENDED REACH AND CAPACITY

TECHNICAL FIELD

This disclosure relates to Time-Wavelength-Division Passive Optical Network (TWDM-PON) architecture with extended reach and capacity.

BACKGROUND

A basic communication system includes a transmitter that converts a message to an electrical form suitable to be transferred over a communication channel. The communication channel transfers the message from the transmitter to the receiver. The receiver receives the message and converts it back to its original form.

Fiber optic communication is an emerging method of transmitting information from a source (transmitter) to a destination (receiver) using optical fibers as the communication channel. Optical fibers are flexible, transparent media made of thin glass silica or plastic that transmits light throughout the length of the fiber between the source and the destination. Fiber optic communications allow for the transmission of data over longer distances and at higher bandwidth than other known forms of communications. Fiber optics are an improved form of communication over metal wires because the light traveled through the fiber experiences less loss and is immune to electromagnetic interference. Companies use optical fibers to transmit telephone signals, internet communication, and cable television signals. A fiber-to-the-home (FTTH) network or fiber access network connects the end users using optical fiber as the last mile connection from the service provider.

Fiber-optic communication provides a very low loss of signal and very high-bandwidth. These two properties allow service providers to directly connect to end-users from their central office (CO) using a passive fiber plant, which produces capital and operational cost savings. As demand for bandwidth in today's Internet continues to increase, Fiber-to-the-home (FTTH) networks have become a good future proof technology for carriers to wire and rewire customers.

SUMMARY

In an access network, upgrading from one technology to another or improving the network architecture may be difficult due to updates in hardware at a central office (CO) and at optical network units (ONUs) located at customer premises. Each optical line terminal (OLT) in the CO serves one ONU in WDM networks and multiple ONUs in TDM networks. Therefore, upgrading the access network may be challenging due to timing of hardware upgrades at the ONUs. This disclosure provides a system and method of upgrading and expanding an access network to an upgraded/expanded architecture that allows efficient use of feeder fibers, therefore saving cost. The new architecture allows consolidations of COs with other PON networks (e.g., super-PON), reducing the operation cost and the network management efficiency.

One aspect of the disclosure provides a communication system that includes first, second, and third multiplexers. The first multiplexer (e.g., MUX) is configured to multiplex a first optical line terminal signal having a first multiplexing group (e.g., TDM) and a second optical line terminal signal having a second multiplexing group into a first multiplexed signal. The second multiplexer (e.g., DEMUX) is configured to demultiplex a second multiplexed signal into a third optical line terminal signal having the first multiplexing group and a fourth optical line terminal signal having the second multiplexing group. The third multiplexer is optically connected with the first multiplexer and the second multiplexer. The third multiplexer is configured to multiplex/demultiplex between a feeder optical signal and the first and second multiplexed signals. The first and second optical line terminal signals each includes a wavelength in the legacy downstream free spectral range. In addition, the third and fourth optical line terminal signals each includes an upstream wavelength each in the legacy upstream free spectral range.

Implementations of the disclosure may include one or more of the following optional features. In some implementations, the system further includes at least one of a first amplifier or a second amplifier. The first amplifier is optically connected with the first multiplexer (MUX) and the third multiplexer (BAND MUX) and is configured to optically amplify the first multiplexed signal. The second amplifier is optically connected with the second multiplexer (DEMUX) and the third multiplexer (BAND MUX) and is configured to optically amplify the second multiplexed signal. In some examples, the first multiplexing group includes a time-division-multiplexing passive optical network (TDM-PON) protocol and the second multiplexing group includes a wavelength-division-multiplexing passive optical network (WDM-PON) protocol, where each wavelength is a point-to-point link. The first optical line terminal signal and the third optical line terminal signal may each have a first protocol. Moreover, the second optical line terminal signal and the fourth optical line terminal signal may each have a second protocol different from the first protocol.

In some implementations, the system further includes a first optical line terminal and a second optical line terminal. The first optical line terminal has an output optically connected with the first multiplexer and an input in optically connected with the second multiplexer. The first optical line terminal transmits the first optical line terminal signal and receives the third optical line terminal signal. The second optical line terminal has an output optically connected with the first multiplexer and an input optically connected with the second multiplexer. The second optical line terminal transmits the second (pt-2-pt) optical line terminal signal and receives the fourth (pt-2-pt) optical line terminal signal.

The first multiplexer is further configured to multiplex a fifth optical line terminal signal with the first and second optical line terminal signals into the first multiplexed signal. The first optical line terminal signal may have a first protocol. The fifth optical line terminal signal may have the first multiplexing group (TDM-PON) and a second protocol different from the first protocol. The second multiplexer is further configured to demultiplex the second multiplexed signal into the second optical line terminal signal, the fourth optical line terminal signal (pt-2-pt), and a sixth optical line terminal signal. The sixth optical line terminal signal has the first multiplexing group and the second protocol. The system further includes a third line terminal that has an output in communication with the first multiplexer and an input in communication with the second multiplexer. The third optical line terminal transmits the fifth optical line terminal signal and receives the sixth optical line terminal signal.

In some implementations, the system further includes a feeder optical fiber and an arrayed waveguide grating. The feeder optical fiber is optically connected with the third multiplexer and arranged to convey the feeder optical signal.

The arrayed waveguide grating is optically connected with the feeder optical fiber and is configured to multiplex/demultiplex between the feeder optical signal and optical network unit signals. Each optical network unit signal includes an upstream wavelength in the legacy upstream free spectral range and a downstream wavelength in the legacy downstream free spectral range.

The system may further include a fourth multiplexer and a fifth multiplexer. The fourth multiplexer is optically connected with the third multiplexer and is configured to multiplex a fifth optical line terminal signal having the first multiplexing group and a sixth optical line terminal signal (pt-2-pt) having the second multiplexing group into a third multiplexed signal. The fifth multiplexer is optically connected with the third multiplexer and configured to demultiplex a fourth multiplexed signal into a seventh optical line terminal signal having the first multiplexing group and an eighth optical line terminal signal (pt-2-pt) having the second multiplexing group. The fifth and sixth (pt-2-pt) optical line terminal signals each includes a downstream wavelength in the upgrade downstream free spectral range, and the seventh (TDM PON) and eight (pt-2-pt) optical line terminal signals each includes an upgrade upstream wavelength in the upstream free spectral range. The system may further include a feeder optical fiber and an arrayed waveguide grating. The feeder optical fiber is optically connected with the third multiplexer and arranged to convey the feeder optical signal. The arrayed waveguide grating is optically connected with the feeder optical fiber and configured to multiplex/demultiplex between the feeder optical signal and optical network unit signals. Each optical network unit signal includes a legacy upstream wavelength in the legacy upstream free spectral range, a legacy downstream wavelength in the legacy downstream free spectral range, an upgrade upstream wavelength in the upgrade upstream free spectral range, and an upgrade second downstream wavelength in the upgrade downstream free spectral range. The system may further include at least one of a first amplifier or a second amplifier. The first amplifier is optically connected with the fourth multiplexer and the third multiplexer and configured to optically amplify the third multiplexed signal. The second amplifier is optically connected with the fifth multiplexer and the third multiplexer and configured to optically amplify the fourth multiplexed signal. In some examples, the system also includes a third optical line terminal and a fourth optical line terminal. The third optical line terminal has an output in communication with the fourth multiplexer and an input in communication with the fifth multiplexer. The third optical line terminal transmits the fifth optical line terminal signal and receives the seventh TDM-PON optical line terminal signal. The fourth optical line terminal having an output in communication with the fourth multiplexer and an input in communication with the fifth multiplexer, the fourth optical line terminal transmitting the sixth (pt-2-pt) optical line terminal signal and receiving the eighth (pt-2-pt) optical line terminal signal.

Another aspect of the disclosure provides a method that includes receiving, at a first multiplexer (MUX), and multiplexing/demultiplexing between: a first multiplexed signal; and a first optical line terminal signal having a first multiplexing group and a second optical line terminal signal (pt-2-pt) having a second multiplexing group. The method also includes receiving, at a second multiplexer, and multiplexing/demultiplexing between: a second multiplexed signal; and a third optical line terminal signal having the first multiplexing group and a fourth optical line terminal signal having the second multiplexing group. The method also includes receiving, at a third multiplexer optically connected with the first multiplexer and the second multiplexer, and multiplexing/demultiplexing between: a feeder optical signal; and the first and second multiplexed signals. The first and second optical line terminal signals each include a downstream wavelength in the legacy downstream free spectral range, and the third and fourth optical line terminal signals each include an upstream wavelength each in the legacy upstream free spectral range.

This aspect may include one or more of the following optional features. In some implementations, the method further includes amplifying, at a first amplifier optically connected with the first multiplexer and the third multiplexer, the first multiplexed signal; or amplifying, at a second amplifier optically connected with the second multiplexer and the third multiplexer, the second multiplexed signal.

In some examples, the first multiplexing group includes a time-division-multiplexing passive optical network protocol and the second multiplexing group includes a wavelength-division-multiplexing (WDM) passive optical network protocol, where each wavelength is a point-to-point link. The first optical line terminal signal and the third optical line terminal signal may each have a first protocol, and the second optical line terminal signal and the fourth optical line terminal signal may each have a second protocol different from the first protocol.

In some implementations, the method further includes receiving, at the first multiplexer (MUX), and multiplexing/demultiplexing between: the first multiplexed signal; and a fifth optical line terminal signal, the first optical line terminal signal, and the second optical line terminal signal. The first optical line terminal signal has a first protocol, and the fifth optical line terminal signal (TDM-PON, $\lambda_2$) has the first multiplexing group and a second protocol different from the first protocol. The method also includes receiving, at the second multiplexer, and multiplexing/demultiplexing between: the second multiplexed signal; and the second optical line terminal signal, the fourth optical line terminal signal, and a sixth optical line terminal signal (TDM-PON $\lambda_2$). The sixth optical line terminal signal has the first multiplexing group and the second protocol.

The method may also include transmitting, by way of a feeder optical fiber optically connected with the third multiplexer, the feeder optical signal. The method also includes receiving, at an arrayed waveguide grating optically connected with the feeder optical fiber, and multiplexing/demultiplex between the feeder optical signal and optical network unit signals. Each optical network unit signal includes an upstream wavelength in the legacy upstream free spectral range and a downstream wavelength in the legacy downstream free spectral range.

In some implementations, the method includes receiving, at a fourth multiplexer optically connected with the third multiplexer, and multiplexing/demultiplexing between: a third multiplexed signal; and a fifth optical line terminal signal having the first multiplexing group and a sixth optical line terminal signal having the second multiplexing group. The method also includes receiving, at a fifth multiplexer optically connected with the third multiplexer, and multiplexing/demultiplexing between: a fourth multiplexed signal; and a seventh optical line terminal signal having the first multiplexing group and an eighth optical line terminal signal (pt-2-pt) having the second multiplexing group. The fifth and sixth optical line terminal signals each includes a downstream wavelength in the upgrade downstream free spectral range, and the seventh and eight optical line terminal signals each include an upstream wavelength in the upgrade upstream free spectral range. The method may further include transmitting, by way of a feeder optical fiber optically connected with the third multiplexer, the feeder optical signal. The method also includes receiving, at an arrayed waveguide grating optically connected with the feeder optical fiber, and multiplexing/demultiplex between the feeder optical signal and optical network unit signals. Each optical network unit signal includes a legacy upstream wavelength in the legacy upstream free spectral range, a legacy downstream wavelength in the legacy downstream free spectral range, an upgrade upstream wavelength in the upgrade upstream free spectral range, and an upgrade downstream wavelength in the upgrade downstream free spectral range.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 9A is an example schematic view of a prior art TDM-PON network.

FIG. 9B is an example schematic view of an example TWDM-PON network.

Like reference symbols in the various drawings indicate like elements.

DETAILED DESCRIPTION

Figure 1:
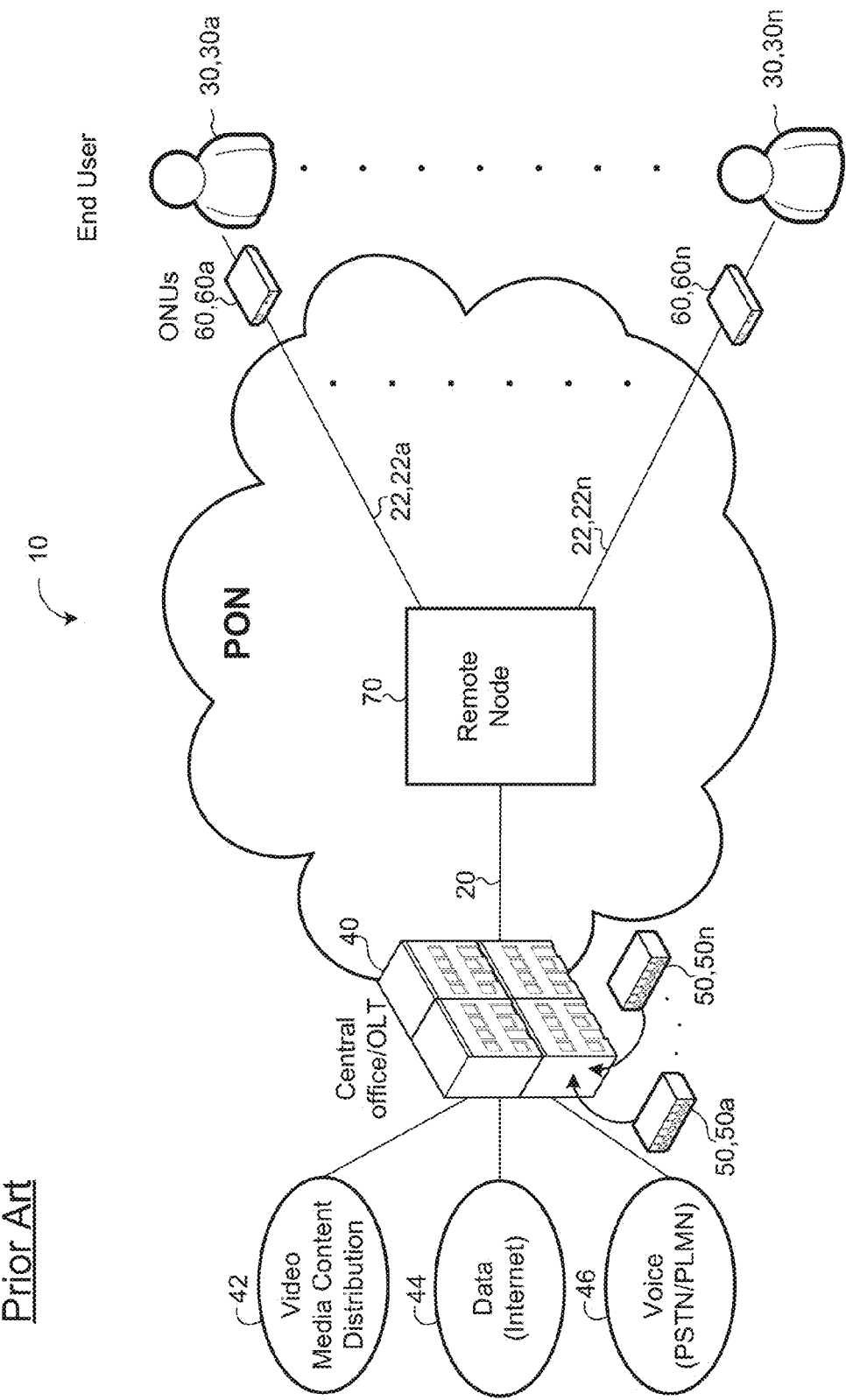
FIG. 1 is a schematic view of a prior art PON architecture.

Fiber-to-the-home (FTTH) is the delivery of a communication signal through optical fibers from a central office (CO) or optical line terminal (OLT) to a home or a business of a user. Referring to FIG. 1, today's FTTH systems are mostly offered through point-to-multi-point time division multiplexed (TDM) passive optical networks (PONs) using a passive optical power splitter at a remote node 70 (RN) in the field to share a common transceiver 50 (OLT) at the CO 40, or through point-to-point (pt-2-pt) direct connection, where a home-run fiber extends all the way back to the CO 40 and each customer is terminated by a separate transceiver, as opposed to the shared transceiver (TDM transceiver). PON 10 provides optical signals from a CO 40 and includes an optical transmitter/receiver or transceiver 50 to a number of optical network units (ONUs) 60 on customer premises that each includes a bidirectional optical transceiver.

Compared to pt-2-pt home run systems, a TDM-PON provides beneficial savings in the number of feeder fibers 20 (between a remote node 70 and the central office 40), and in the number of optical transceivers 50 at the CO 40 while saving patch panel space to terminate fibers. However, TDM-PON does not scale well with bandwidth growth. The bandwidth per household is often oversubscribed, since the bandwidth per optical line terminal transceiver at the central office 40 is shared among all ONUs 60 that are connected to an OLT 50.

Pt-2-pt systems provide high bandwidth to end users 30; however, pt-2-pt uses a great number of both trunk fibers 20 and optical transceivers 50. Thus, pt-2-pt systems do not scale well with the OLT 50 at the CO 40 and the fiber count between the CO 40 and the RN 70, resulting in greater space requirements, higher power, and an increased cost.

Fiber to the home (FTTH) is regarded as the end state of broadband access networks as fiber offers virtually unlimited bandwidth. FTTH replaces currently used copper infrastructure (e.g., telephone wires, coaxial cable, etc.). Multiplexing is a method used in optical networks to utilize the large bandwidth of optics to their full benefits. Multiplexing enables several virtual channels to be formed on a single fiber. Therefore, multiplexing several optical signals increases the utility of a network infrastructure. Time division multiplexing (TDM) is a method used to multiplex several signals onto one high-speed digital signal on a fiber optic link. TDM multiplexes several signals by establishing different virtual channels using different time slots. Wavelength division multiplexing (WDM) multiplexes the signals by having different channels use different wavelengths; these channels are generated by separate lasers and their traffic typically does not interact.

With continued reference to FIG. 1, the CO 40 receives information, such as video media distribution 42, internet data 44, and voice data 46 that may be transferred to the end users 30. The CO 40 includes an optical line terminal (OLT) 50 connecting the optical access network to an IP, ATM, or SONET backbone, for example. Therefore, the OLT 50 is the endpoint of the PON 10 and converts the electrical signals used by a service provider's equipment and the fiber optic signals used by the PON 10. In addition, the OLT 50 coordinates multiplexing between the conversion devices at the user end 30. The OLT 50 sends the fiber optic signal through a feeder fiber 20, and the signal is received by a passive remote node 70, which distributes the signal to multiple users 30. In some examples, each CO 40 includes multiple OLTs 50, 50*a-n*. Each OLT 50 is configured to provide a signal to a group of users 30. In addition, each OLT 50 may be configured to provide signal or services that are in different transmission protocols, e.g., one OLT provides services in 1G-PON and another provides services in 10G-PON (as will be discussed later).

A multiplexer (MUX) combines several input signals and outputs a combined signal of the separate signals. The multiplexed signal is transmitted through a physical wire, e.g., single optical fiber 20, which saves the cost of having multiple wires for each signal. As shown in FIG. 1, the CO 40 multiplexes the signals received from several sources, such as video media distribution 42, internet data 44, and voice data 46, and multiplexes the received signals into one multiplexed signal before sending the multiplexed signal to the remote node 70 through the feeder fiber 20. In addition, the CO 40 multiplexes the signals of each OLT 50 before sending the multiplexed signal to the remote node set through the feeder fiber 20. The CO 40 includes a carrier source (e.g., a laser diode or a light emitting diode) for generating an optical signal that carries the multiplexed signal to the end user 30. On the receiver end, i.e., the ONU 60 at the user end, a reverse process occurs using a demultiplexer. The demultiplexer receives the multiplexed signal and divides it into the separate original signals that were originally combined. In some examples, a photodetector converts the optical wave back into its electric form and is located at the remote node or at the end user 30 (e.g., data over a network, sound waves converted into currents using microphones and back to its original physical form using speakers, converting images converted into currents using video cameras and converting back to its physical form using a television). In TDM PONs, the demultiplexing of the signal occurs after the photodiode in the electrical domain.

A transceiver or ONU 60, on the user end, includes a carrier source (e.g., laser diode or light-emitting diode) for generating an optical signal that carries the information to be sent from an end user 30 to the CO 40. A laser is a high-frequency generator or oscillator, which requires amplification, feedback, and a tuning mechanism that determines the frequency. Lasers emit light coherently such that the laser output is a narrow beam of light. In some implementations, a laser includes a medium that provides the amplification and the frequency, and mirrors that provide the feedback. Photons bounce off one mirror through the medium and head back to another mirror to bounce back for further amplification. One, and sometimes both mirrors, may partially transmit light to allow a fraction of the generated light to be emitted. A laser diode is an electrically pumped semiconductor laser having an active medium being a p-n junction. The p-n junction is created by doping (i.e., introduction of impurities into a pure semiconductor to change its electrical properties). As shown, one feeder fiber 20 is employed from the CO 40 to a remote node 70, where the signal is split and distributed to, for example, optical network units 60a-60n.

Figure 2A:
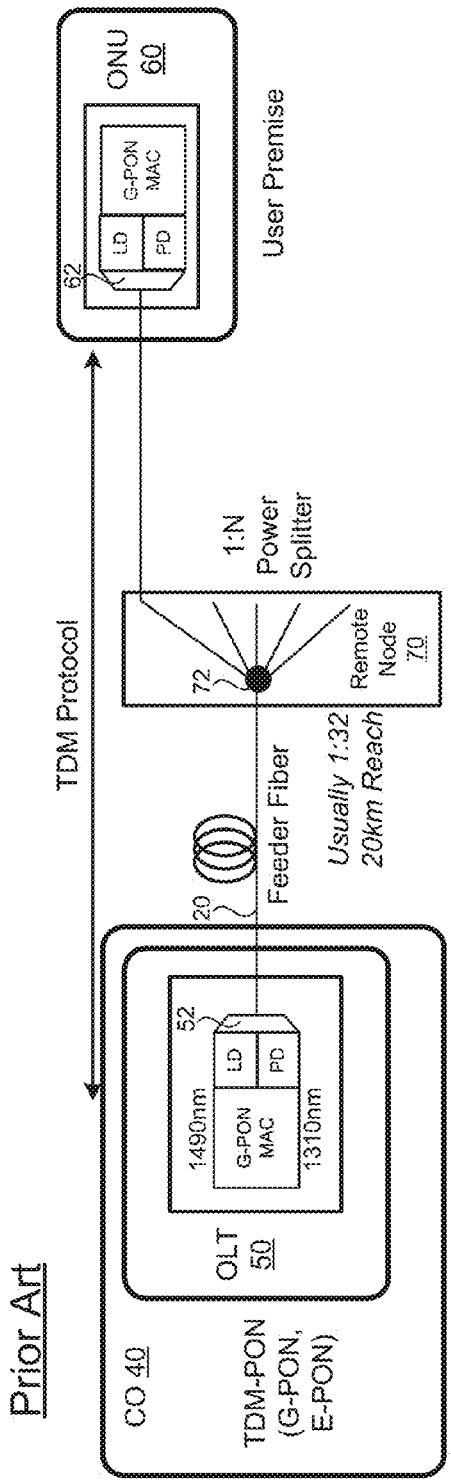
FIG. 2A is a schematic view of a prior art TDM-PON architecture.

Referring to FIG. 2A, the most commonly deployed TDM-PON systems are the GPON systems standardized by ITU (International Telecommunication Union) and the EPON system standardized by IEEE (Institute of Electrical and Electronics Engineers). A GPON system offers 2.5 Gb/s downstream bandwidth and 1.25 Gb/s upstream bandwidths, shared on the feeder fiber 20 among the users 30, and connected to the same OLT transceiver 50. GPON systems are mature and very cost effective. TDM PON faces difficulty in bandwidth scaling as the optical transceivers of both the OLT 50 and the ONU 60 ends need to operate at the aggregate bandwidth of all of the ONUs 60 sharing the same OLT 50. TDM-PONs typically may have a 1:16 to 1:64 power splitting ratio. The average bandwidth per user and PON reach scales inversely with respect to the splitting ratio.

The TDM-PON architectures include two wavelengths used to separate the upstream and downstream transmissions. In both G-PON and E-PON, 1310-nm wavelength is used for upstream transmission from the ONU 60 at the customer premise to the OLT 50 at the CO 40 and 1490-nm wavelength is used for the transmission from the OLT 50 at CO 40 to ONUs 60 at the user 30 premises. The upstream and downstream wavelengths are multiplexed on a single fiber 20, 22 with an optical wavelength diplexer 52 in front of the laser diode (LD) transmitter 54 and photo-detector (PD) receiver 56. The optical signal from the OLT 50 is split in the field with a 1:N power splitter 72 to broadcast the signal to multiple ONUs 60 serving different users 30. The distance between the OLT 50 and ONU 60 is limited by the OLT/ONU transmitter power and receiver sensitivity, as well as splitting loss. The OLT transceiver 50 is shared among the users 30 on the same power splitter 72 using a TDM protocol, simplifying the fiber termination at the CO 40 and spreading the cost of the transceivers 50 across multiple ONUs 60. Typical GPON and EPON designs use splitting ratios of 1:16, 1:32, or 1:64 and a transmission distance up to 20 km.

Figure 2B:
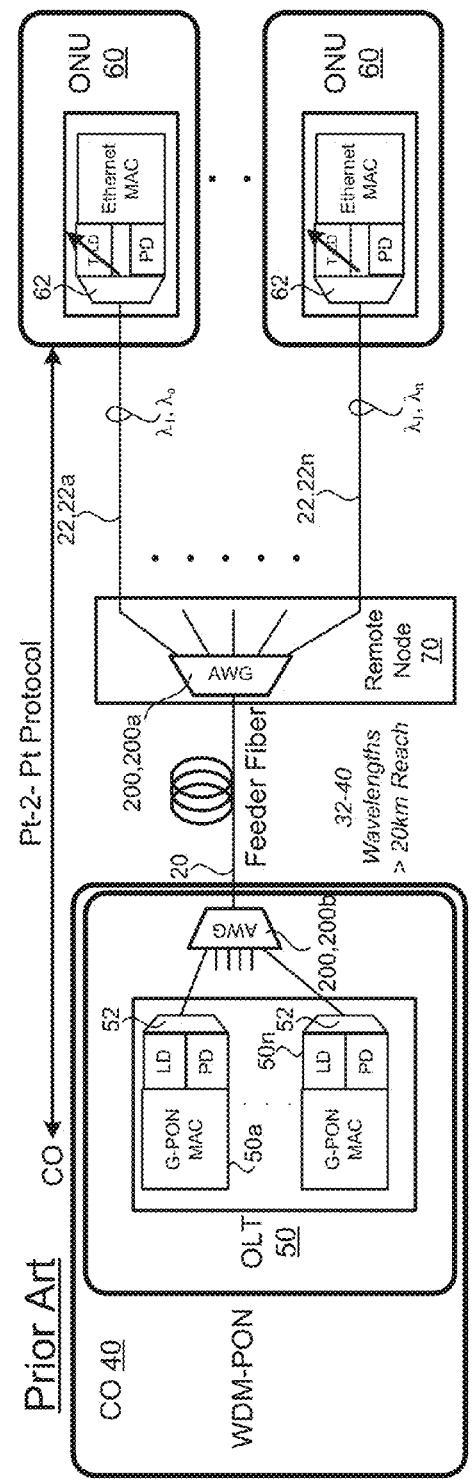
FIG. 2B is a schematic view of a prior art WDM-PON architecture.
Figure 3A:
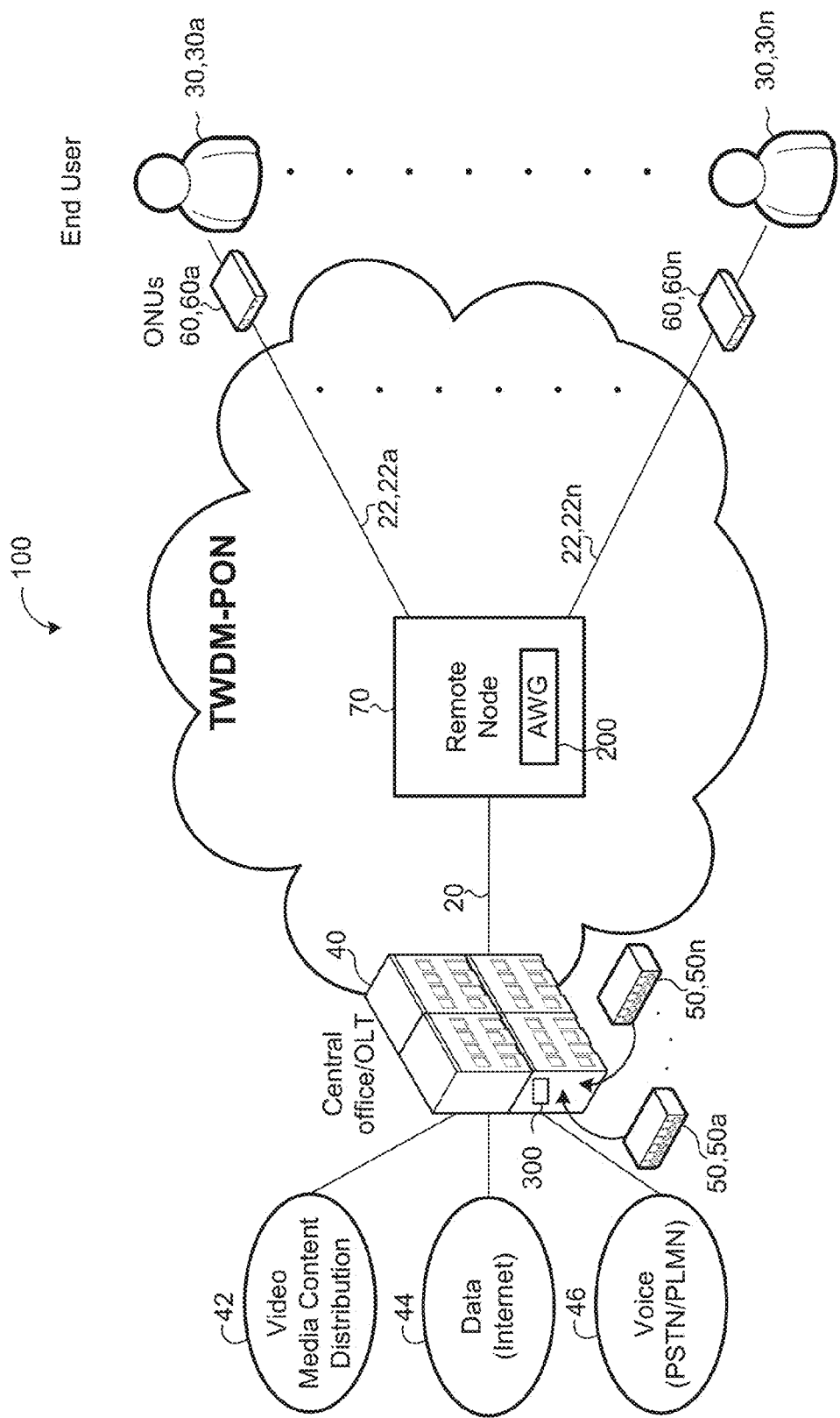
FIG. 3A is a schematic view of an example TWDM-PON architecture.
Figure 3B:
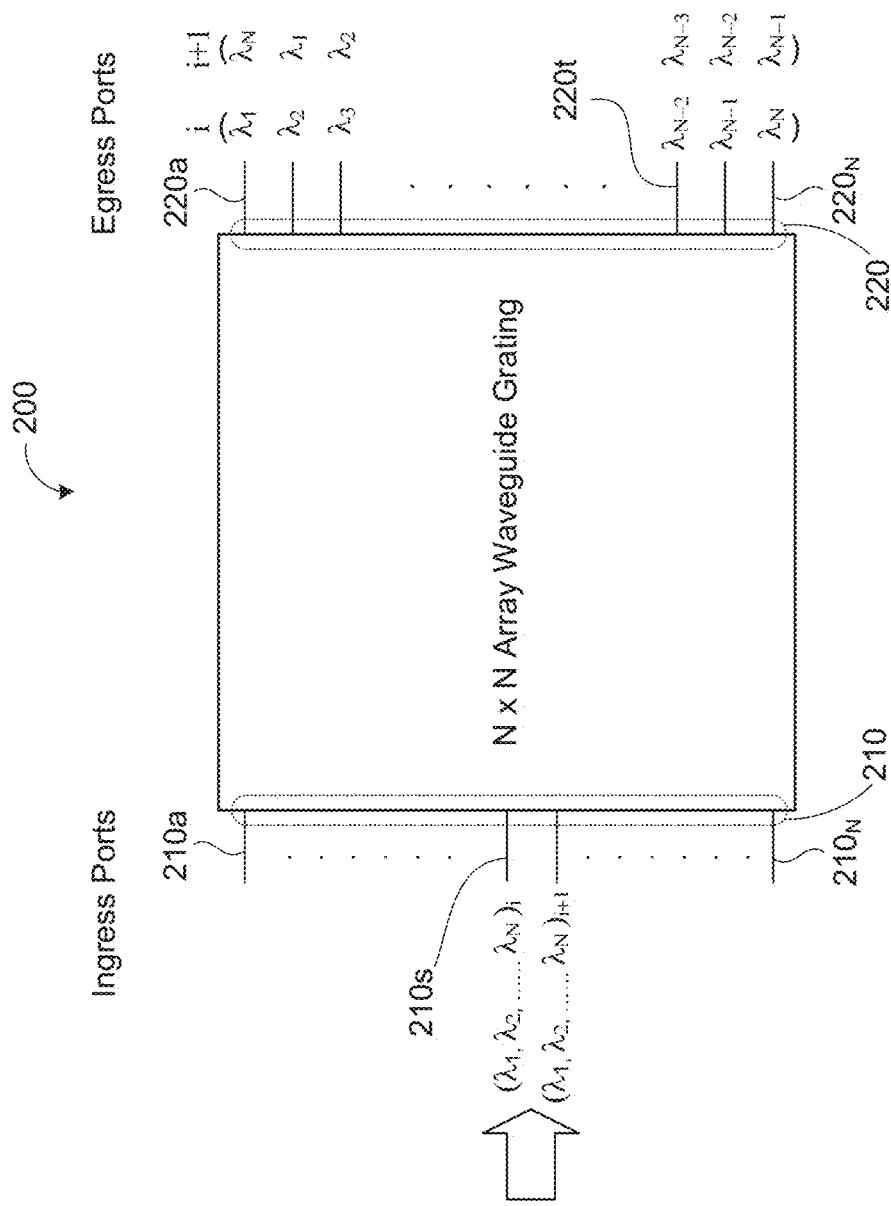
FIGS. 3B and 3C are schematic views of example arrayed waveguide gratings (AWGs).
Figure 3C:
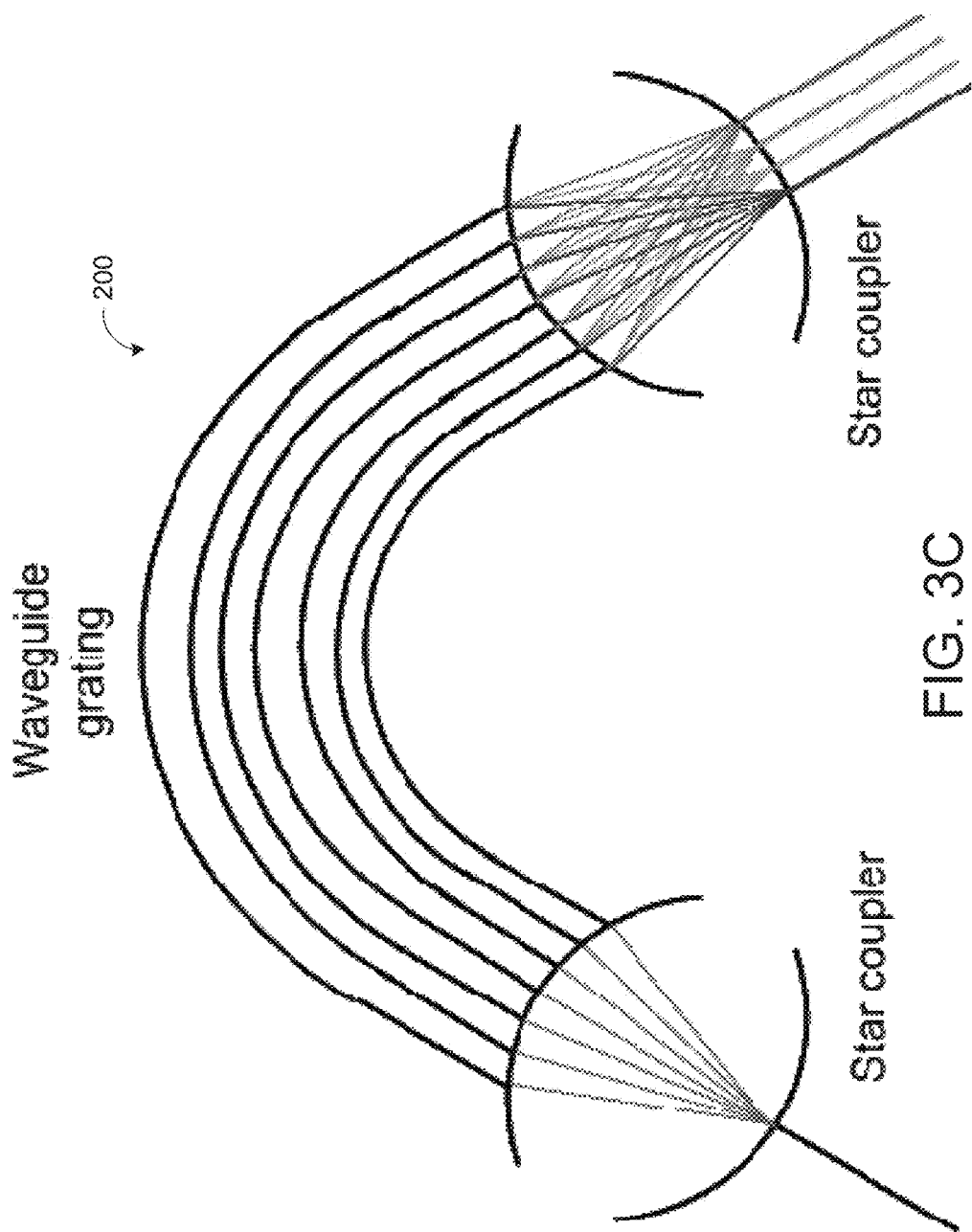

An alternative FTTH architecture is the WDM-PON architecture shown in FIG. 2B. Wavelength division multiplexing (WDM) PON gives each user 30 a dedicated wavelength in each transmission direction. In a WDM-PON network, each user 30 is allocated a different wavelength λ for upstreaming data to the CO 40. Therefore, each ONU 60 uses a wavelength-specific transmitter 62, such as a tunable wavelength laser, to transmit data to the CO 40 at different wavelengths λ. The tunable wavelength laser may be tuned at the time of deployment for each particular path 22 (corresponding to a user 30), which allows the use of one type of transceiver 60 by all users 30. The WDM-PON system provides a greater overall system capacity FTTH network because the total capacity is the channel capacity multiplied with the number of wavelengths used. In this architecture, each customer ONU 60 has a corresponding OLT 50 transmitter at the CO 40. Therefore, for 32 customers having 32 ONUs 60, the CO 40 has 32 OLTs 50 each sending a signal to an ONU 60. Signals from a CO 40 to individual ONUs 60 are carried using different wavelengths, and multiplexed in the fiber plant 20, 22 using a wavelength multiplexer 200, 200a, usually an Arrayed Waveguide Grating Router (AWG) in the field. Another wavelength multiplexer/demultiplexer 200, 200b inside the CO 40 separates the optical wavelengths in the feeder fiber 20 and connects them to individual 'colored' OLT transceivers 50, 50a-50n. The field AWG 200 is usually a cyclical device with multiple free spectral ranges (FSR) and the upstream and downstream wavelengths are separated by the FSR, as shown in FIGS. 3A-3C. In FIG. 2B, both wavelength multiplexers 200 in the field and in the CO are cyclical AWGs.

Figure 2C:
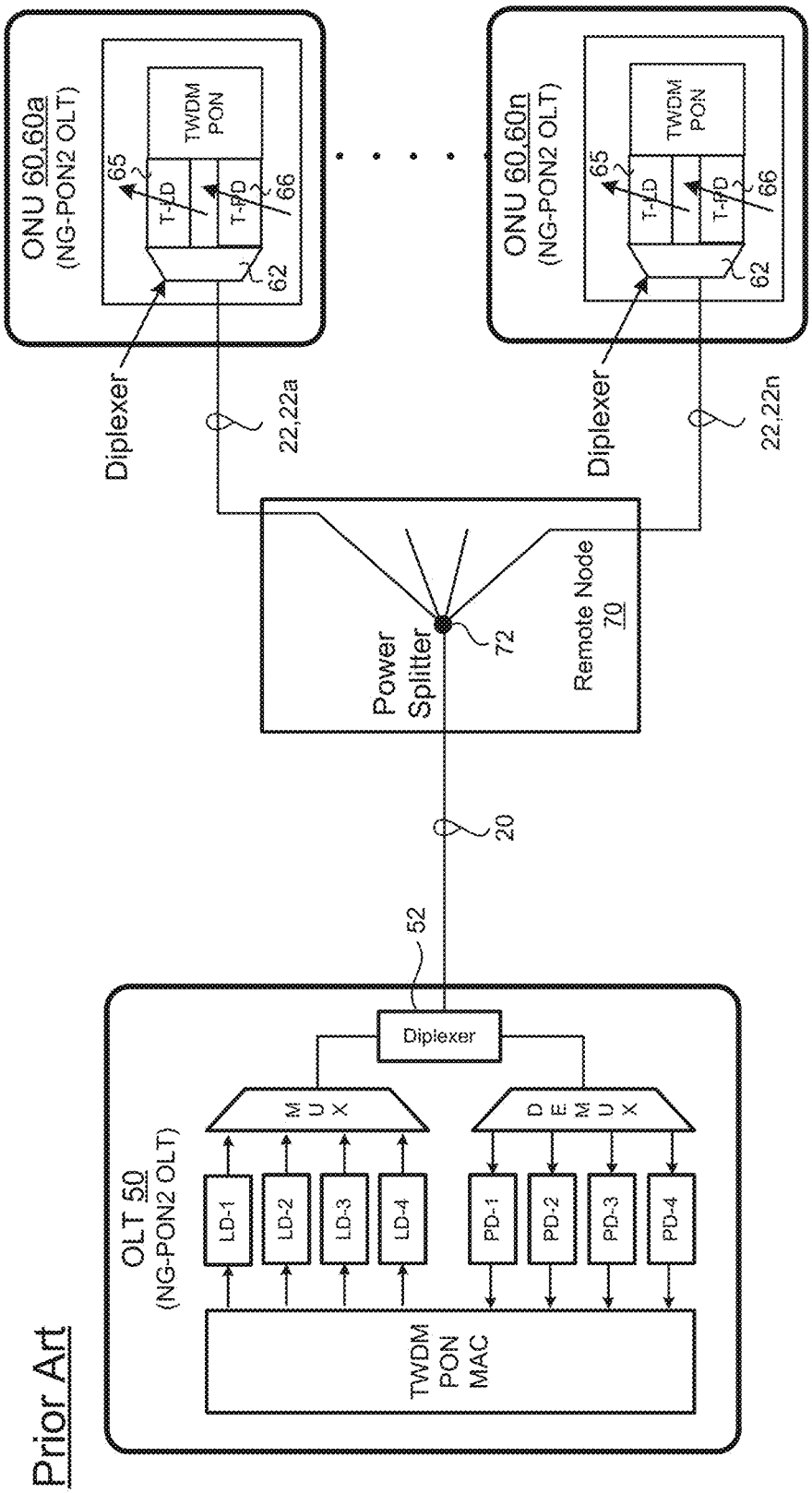
FIG. 2C is a schematic view of a prior art NG-PON2 architecture.

Aspects of TDM architecture and WDM architecture may be combined into a time-wavelength division multiplexing PON (TWDM-PON). In one example of a TWDM-PON architecture, as shown in FIG. 2C, and proposed in the ITU-T SG-15 proposed NG-PON2 effort (next generation PON 2), one option for NG-PON2 is to use a four wavelength integrated OLT 50. In NG-PON2, the OLT 50 uses four downstream transmitter lasers (LD-1, LD-2, LD-3, LD-4) and four upstream receivers (PD-1, PD-2, PD-3, PD-4), combined with the diplexer 52 inside the OLT 50. NG-PON2 adopts a fiber plant 20 compatible with traditional TDM-PON, so all the four transmitting wavelengths in the OLT 50 are broadcast to each ONU 60, which has only one receiver 66. Consequently, the ONU 60 needs to use a tunable receiver 66 to select individual downstream wavelengths. At the same time, the ONU 60 is also equipped with a tunable transmitter 65 to tune to one of the four possible receiving wavelengths coming from an NG-PON2 OLT 50. Compared to the WDM-PON in FIG. 2B, where only the ONU transmitter 65 laser needs to be tunable (for inventory and easy operation), NG-PON2 ONU 60 needs to have both a tunable transmitter 65 laser and tunable receiver 66, translating to more expensive hardware. In addition, NG-PON2 must also overcome the extra loss of the power splitter 72 (compared to the AWG 200 used in WDM-PON that inherently has less loss than power splitters for large port counts) and the tunable filter loss in the ONU 60. The aim of NG-PON2 was to increase the system capacity by increasing the TDM rate (10 Gb/s per wavelength) and using multiple wavelengths to enable more users 30 and/or higher bandwidth applications. Nevertheless, the design faces power budget and cost challenges. Another challenge of NG-PON2 is that the OLT 50 and ONU 60 need to manage both wavelength slots and time slots; and requires new MAC layer protocol. A MAC layer data communication protocol assembly of the data link layer (layer 2). The MAC software provides addressing and channel access control mechanisms allowing for several terminals or network nodes to communicate with each other within multiple access networks. A media access control is the hardware that implements the MAC.

Rapidly increasing internet applications are straining the bandwidth available from current TDM-PON systems. While proposed WDM-PON and TWDM-PON solutions somewhat solve the access capacity problem, they are more expensive to deploy. To overcome the long term increase in bandwidth demand cost effectively, an updated TWDM-PON architecture 100 shown in FIG. 3A with higher ONU count per feeder fiber 20 may accommodate the increase in bandwidth demand and take rate. The TWDM-PON architecture 100, (as shown and described with respect to FIGS. 3A-8, 9B, and 10) combines the cost advantage of supporting multiple users 30 on a single wavelength (TDM-PON) with the wavelength flexibility of WDM-PON, which allows wavelengths to be dedicated to particular subscribers or applications. The upgraded TWDM-PON architecture 100 uses a combination of the TDM and WDM technologies\architectures described above (with respect to FIGS. 2A, 2B and 2C) to multiply the number of users 30 and the capacity that may be supported on a single PON. The upgraded TWDM-PON 100 reduces the cost and construction time of fiber infrastructure and shortens the network design cycle. In addition, the upgraded TWDM-PON 100 provides for thinner fiber bundles 20, 22 to be used between the CO 40 and the RN 70, and between the RN 70 and the ONUs 60, which leads to smaller conduits that are easier to deploy. In addition, the upgraded TWDM-PON 100 increases the coverage distance, i.e., the length of the feeder fiber 20, 22 and enables super PON designs, which allow the upgraded TWDM-PON 100 to consolidating and reduce the number of COs 40 and reduces the long term recurring cost in network operation. Moreover, the upgraded TWDM-PON 100 does not require tunable receivers at the ONUs 60, which significantly decreases the cost of the network 100. The upgraded TWDM-PON 100 may achieve similar overall capacity per feed fiber shown in FIG. 2C (NG-PON2, 40 Gbps) with 16 wavelengths and current GPON speed (2.5 Gbps downstream and 1.25 Gbps upstream). In addition, the upgraded TWDM-PON 100 better scales with transmission distance over the feeder fiber 20, 22, and has better power budget and dispersion tolerance compared to NG-PON2.

As previously described, TDM-PONs use an optical power splitter 72 at the RN 70 to connect multiple ONUs 60 to each OLT 50. When a large number of wavelengths is transmitted over an optical power splitter 72 in TWDM-PON, each ONU 60 includes a blocking filter to block out-of-band wavelengths. In some examples, a tunable ONU 60 is used and includes a tunable narrow band filter. Use of a tunable ONU 60 increases the cost of each ONU 60, which leads to an increase in the cost of the network 100. Moreover, the power splitter 72 at the RN 70 may not achieve large split ratios because the total power loss for a large splitter is difficult to overcome by the transmitters 54, 65 and receivers 56, 66, at the OLTs 50 and ONUs 60. Therefore, in the upgraded TWDM-PON architecture (FIG. 3A) it is desirable to use a wavelength selective (de)multiplexer, such as the cyclical arrayed waveguide grating router (AWG) 200 to greatly increase the maximum split ratio and remove the need for narrow-band filters at the ONUs 60, thereby reducing the cost (by not using tunable receivers). Additionally, the cyclical AWG 200 decouples the loss from the number of ports, thereby allowing a higher split ratio with lower loss. Multiple TDM PONs (e.g., 1G-PON and 10G-PON) using an AWG 200 may be thought of as a TWDM-PON, since WDM is utilized to increase overall capacity of the network.

FIGS. 3A-3E illustrate an exemplary arrayed waveguide grating 200 (AWG) used in the upgraded TWDM-PON architecture 100. An AWG 200 may be used to demultiplex an optical signal in the upgraded TWDM-PON 100, for example at the RN 70 or at the OLT 50. AWGs 200 can multiplex a large number of wavelengths into one optical fiber, thus increasing the transmission capacity of optical networks 100. AWGs 200 can therefore multiplex channels of several wavelengths onto a single optical fiber at a transmission end, and reciprocally they can also demultiplex different wavelength channels at the receiving end of an optical communication network. An AWG 200 is a passive planar light wave circuit device typically used in optical networks as a wavelength multiplexer and/or demultiplexer. N×N AWGs 200 also have wavelength routing capabilities. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side. In addition, the wavelength channels on any ingress repeat at the FSR. In some implementations, the AWG 200 receives a first multiplexed optical signal at a first input 210a (e.g., input 1) via a first optical fiber. The AWG 200 demultiplexes the received signal and outputs demultiplexed signals through its outputs 220, 220a-n (e.g., outputs 1-32).

The AWG 200 is cyclic in nature. The wavelength multiplexing and demultiplexing property of the AWG 200 repeats over periods of wavelengths called free spectral range (FSR). Multiple wavelengths, separated by the free spectral range (FSR), are passed down each port 220. Therefore, by utilizing multiple FSR cycles, different tiered services may coexist on the same fiber plant 20, 22.

In some implementations, to construct a low-loss cyclic AWG 200, the star couplers and the waveguide grating should be carefully designed. The arrayed waveguides in the fiber grating should be correctly engineered. The phase difference between waveguides in the grating is a factor that determines the FSR B1-B4 of the AWG 200. The channel-by-channel loss profile within one FSR B1-B4 is related with the overlap integral between the eigenmode (natural vibration of the AWG 200) of the output channel waveguide and beamlets diffracted from the waveguide arms in the grating. The end channels of any FSR B1-B4 typically have a larger loss and compromised pass-band. It is usually optimal to design around four or six more channels than the desired number of channels, thereby wasting four or six channels of bandwidth per cycle, respectively.

The disadvantage of using a cyclic AWG 200 with small FSR is that the channel spacing may vary slightly from cycle to cycle. The wavelength spacing, with respect to frequency, may be wider for shorter wavelengths. The waveguide arm phase difference, the material dispersion, i.e., the refractive index changing with wavelength, and waveguide cross-section design all contribute to the variation in channel spacing across FSRs. The channel spacing can be optimized by proper material choice and waveguide design, but it is very difficult to make a uniform frequency spacing across multiple FSRs. Thus, in some examples, a larger AWG 200 is used in combination with splitters 72 (see, for example, FIG. 4).

The AWG 200 may have multiple cycles of optical wavelengths ranges with repeating multiplexing and demultiplexing properties. As shown in FIG. 3C, each cycle B1-B4 is often referred to as an FSR. A multi-cycle AWG 200 sends multiple wavelengths $\lambda_1$-$\lambda_{16}$, separated by the FSR, down each port 220, 220a-220d. In most PON systems, different wavelengths are used for upstream and downstream of signals due to the near-far-effect. The near-far effect is a condition where a receiver captures a strong signal and thereby making it impossible for the receiver to detect a weaker signal. This allows the use of a wavelength selective device, such as a thin-film filter (TFF), to help achieve the required isolation between the uplink and downlink to overcome the near-far effect. Thus, it is assumed that a WDM-PON platform uses two FSR cycles of the cyclical AWG 200 (one cycle for downstream transmission and the other cycle for upstream transmission) for each tier of service. To add a second platform to a network 100, four usable cycles would allow for the simultaneous use of two platforms. Such a system 100 would deliver signals from both platforms to each of the users 30, and each AWG output 220 would output/receive signals from both platforms. Each AWG output 220 is optically connected with at least one ONU 60, then each ONU 60 would receive signals from both platforms.

Figure 3D:
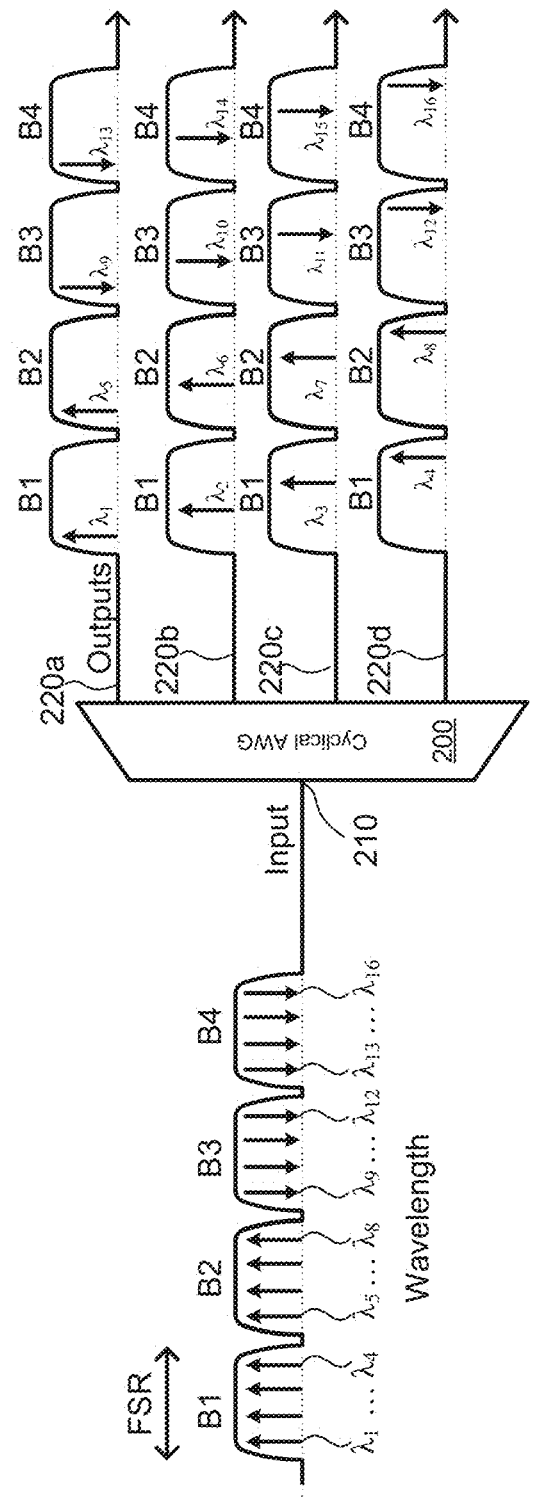
FIG. 3D is a schematic view of the cyclical behavior of the example AWG of FIGS. 2A and 2B.

To further explain the use of two platforms by way of using a cyclical AWG 200, FIG. 3C shows a cyclical AWG 200 having an input 210a and four outputs 220, 220a-220b. The cyclical AWG 200 receives four FSR (bands) B1-B4, as shown in FIG. 3D. FSRs B1 and B2 are used for upstream while FSRs B3 and B4 are used for downstream. FSR B1 includes wavelengths $\lambda_1$-$\lambda_4$, FSR B2 includes wavelengths $\lambda_5$-$\lambda_8$, FSR B3 includes wavelengths $\lambda_9$-$\lambda_{12}$, and FSR B4 includes wavelengths $\lambda_{13}$-$\lambda_{16}$; where $\lambda_1 < \lambda_2 < \lambda_3 < \ldots < \lambda_{15} < \lambda_{16}$. When the cyclical AWG 200 receives the wavelengths $\lambda_1$-$\lambda_{16}$ at its input 210, each wavelength $\lambda_1$-$\lambda_{16}$ is outputted from a different output 220 in a cyclical manner. Therefore, the first wavelength $\lambda_1$ of the first FSR B1 is outputted through the first output 220a of the cyclical AWG 200, the second wavelength $\lambda_2$ of the first FSR B1 is outputted through the second output 220b of the cyclical AWG 200, the third wavelength $\lambda_3$ of the first FSR B1 is outputted through the third output 220c of the cyclical AWG 200, and the fourth wavelength $\lambda_4$ of the first FSR B1 is outputted through the fourth output 220d of the cyclical AWG 200, completing the first cycle. The second cycle begins when the first wavelength $\lambda_5$ of the second FSR B2 is outputted through the first output 220a of the cyclical AWG 200, the second wavelength $\lambda_6$ of the second FSR B2 is outputted through the second output 220b of the cyclical AWG 200, the third wavelength $\lambda_7$ of the second FSR B2 is outputted through the third output 220c of the cyclical AWG 200, and the fourth wavelength $\lambda_8$ of the second FSR B2 is outputted through the fourth output 220d of the cyclical AWG 200, completing the second cycle. The third cycle begins with the first wavelength $\lambda_9$ of the third FSR B3 is outputted through the first output 220a of the cyclical AWG 200, the second wavelength $\lambda_{10}$ of the third FSR B3 is outputted through the second output 220b of the cyclical AWG 200, the third wavelength $\lambda_{11}$ of the third FSR B3 is outputted through the third output 220c of the cyclical AWG 200, and the fourth wavelength $\lambda_{12}$ of the third FSR B3 is outputted through the fourth output 220d of the cyclical AWG 200, completing the third cycle. The fourth cycle begins with the first wavelength $\lambda_{13}$ of the fourth FSR B4 is outputted through the first output 220a of the cyclical AWG 200, the second wavelength $\lambda_{14}$ of the fourth FSR B4 is outputted through the second output 220b of the cyclical AWG 200, the third wavelength $\lambda_{15}$ of the fourth FSR B4 is outputted through the third output 220c of the cyclical AWG 200, and the fourth wavelength $\lambda16$ of the fourth FSR B4 is outputted through the fourth output 220d of the cyclical AWG 200, completing the fourth cycle. In this case, each FSR B1-B4 includes four wavelengths $\lambda_1$-$\lambda_{16}$ (FSR B1 includes wavelengths $\lambda_1$-$\lambda_4$, FSR B2 includes wavelengths $\lambda_5$-$\lambda_8$, FSR B3 includes wavelengths $\lambda_9$-$\lambda_{12}$, FSR B4 includes wavelengths $\lambda_{13}$-$\lambda_{16}$), and the cyclical AWG 200 includes four outputs 220. Therefore, one wavelength from each FSR B1-B4 outputs each AWG output 220. In other words, each AWG output 220 outputs a wavelength from an FSR B1-B4. As described, a first platform may use the first FSR B1 for upstreaming and the third FSR B3 for downstream, and the second platform may use the second FSR B2 for upstreaming and the fourth FSR B4 for downstream. Similarly, the network 100 may support three platforms by using six FSR cycles providing three platforms to each user 30. The network may also provide four platforms by using eight FSR cycles, five platforms by using 10 FSR cycles, and so on. In a TWDM-PON architecture, each wavelength $\lambda$ carries multiple users 30, therefore, the network 100 may be configured to operate different rates of PONs concurrently to serve different tiers of services (e.g., 1 G-PON and 10 G-PON). For example, the service provider at the CO 40 may want to provide a business/premium service on a higher rate PON and standard residential services on a lower rate PON. Referring to the example discussed with respect to FIG. 2C, the business/premium service may use one of the first and third FSRs B1, B3 or the second and fourth FSRs B2, B4, and the low rate PON may use the other one of the first and third FSRs B1, B3 or the second and fourth B2, B4. The service that the user 30 receives is determined by their respective ONU 60, which is part of the customer premises equipment (CPE). The CPE may be configured to receive one or the other of the business premium service or the low rate service. In some examples, if the user 30 wants to upgrade from the low rate service to the business/premium service, the user 30 has to change/upgrade his CPE to be able to receive the upgraded/premium signals that are being transmitted from the CO 40.

Figure 3E:
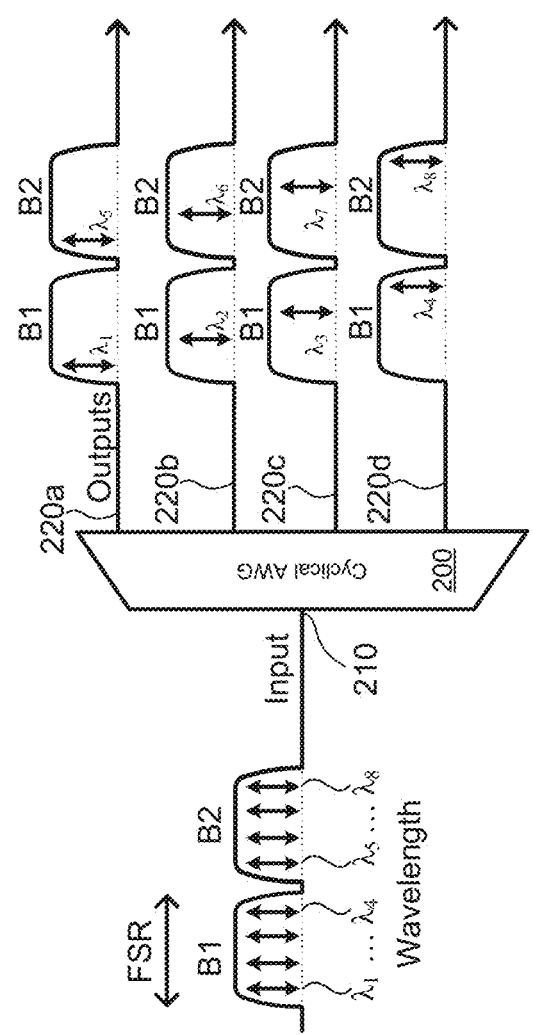
FIG. 3E is a schematic view of a cyclical behavior of the example AWG of FIGS. 2A and 2B, where the uplink and downlinks use the same wavelength.

FIG. 3E shows a system with only two FSRs B1, B2 of four wavelengths each ($\lambda_1$-$\lambda_4$, and $\lambda_5$-$\lambda_8$), totaling eight wavelengths. As shown, the uplink and downlink use the same wavelength. Although this is atypical of most commercial PONs today, there are many proposals of such a technology, including those using reflective semiconductor optical amplifiers at the ONU 60. In addition, the signal at the ingress of the AWG 200 is carrying both uplink and downlink signals for eight different TDM-PONs on eight different wavelengths ($\lambda_1$-$\lambda_4$, and $\lambda_5$-$\lambda_8$). A cyclical AWG 200 with an FSR of four wavelengths is used at the RN 70, thus sending two TDM-PON services down each egress port of the AWG 220a-d. This system therefore works identical to the one shown in FIG. 3D, except wavelength selective technologies, such as TFF, cannot be used as the diplexer at either the OLT 50 or the ONU 60. Instead, a directional device, such as an optical circulator, must provide all of the required optical isolation between the input and output. A wavelength selective component would still be used at both the OLT 50 and ONU 60 to select the free spectral range. If such a technology were to become readily available in the future, after deployment of field AWGs capable of the wavelength plan described in FIG. 3D, it may be desirable to upgrade services to use the same wavelength for upstream and downstream, thus enabling up to four different services to each AWG egress port.

Figure 4:
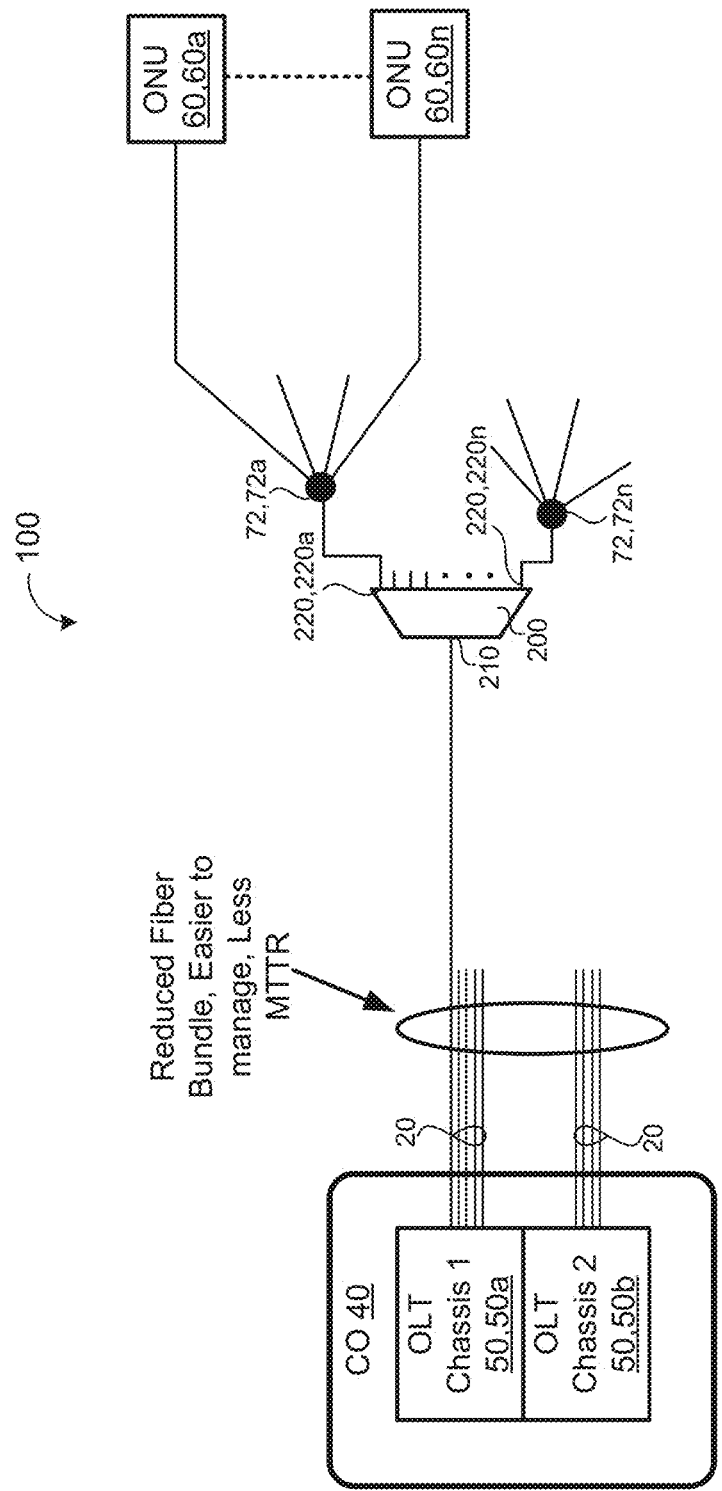
FIG. 4 is a schematic view of an example TWDM-PON architecture with a two-tier service.

FIG. 4 shows a schematic view of the high-level architecture of the TWDM network 100 from the CO 40 to the ONUs 60 associated with the end users 30. TDM-PON systems, such as G-PON or E-PON, are commonly deployed commercial FTTH systems because of their cost and bandwidth efficiency. The systems typically use ratios such as 1:16, 1:32, and 1:64. In TDM-PON, increasing the split ratio decreases overall OLT cost and feeder fiber strands 20, 22 but also decreases the capacity and reach to each user 30, since larger splitters have a larger loss. For example, a CO 40 of 20,000 passings with a 1:32 split ratio means a minimum of 625 fiber strands 20 must be used from the CO 40 to the RN 70. A very large CO 20 of 100,000 passings needs 3125 fibers 20. The larger service area means the average distance between the user 30 and the CO is greater, further increasing the required amount of fiber in the network. Such a large number of feeder fibers 20 makes large COs 40 unattractive because of the high fiber costs and, increased mean time to restore in the event of a fiber cut of a thick fiber cable 20. In addition, larger-sized conduits are used underground to house the thick fibers 20. For aerial fiber constructions, thick cables mean heavy load on utility poles. Therefore, the upgraded TWDM-PON 100 reduces the number of feeder fibers 20, 22 from the CO 40 to service the same number of users 30 by combining both TDM and WDM with a scalable TWDM architecture. As shown in FIG. 4, the upgraded TWDM-PON 100 includes multiple TDM-PONs stacked on a single feeder cable 20 using wavelength division multiplexing. Therefore, if 10 pairs of wavelengths (covered by two FSRs of a ten port cyclical AWG) are used, 10 TDM-PONs may be multiplexed onto a single feeder fiber 20, reducing the number of feeder fibers 20 needed from a CO 40 by ten times. In some examples, an AWG 200 is used in the field to first separate out the wavelength pairs. Each output port 220 of the AWG 200 is followed by a power splitter 72 to split the TDM signal to individual ONUs 60, as in traditional TDM PONs (FIG. 2A). The total number of users 30 or ONUs 60 per feeder fiber 20 is M×N, where M is number of output port 220 of the WDM splitter (e.g., AWG 200) and N is the TDM power splitting ratio of the power splitter 72. Consequently, the number of fibers, conduit size and mean time to repair (MTTR) a fiber cut are reduced by a factor of M.

Figure 5A:
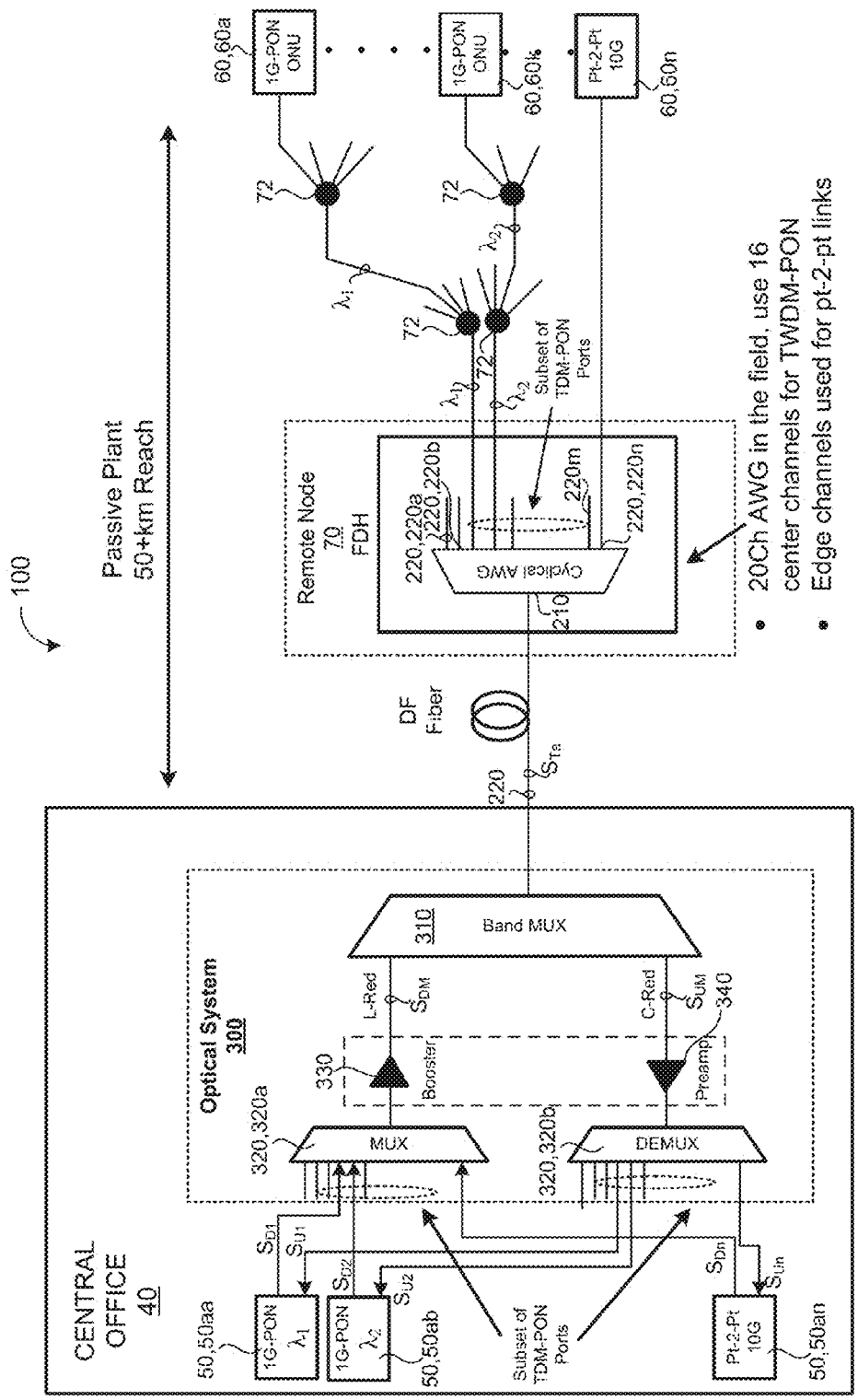
FIGS. 5A and 5B are schematic views of example TWDM-PON architecture.

FIG. 5A shows the upgraded TWDM architecture 100 using 1G-PON to represent TDM-PON. However, the G-PON wavelengths are shifted. "1G-PON $\lambda 1$" at the CO 40 means a G-PON OLT 50 with modified optical layer, so that the G-PON OLT 50 transmits on wavelength $\lambda 1$ of the upstream FSR B1 of the cyclical AWG 200 and receives from the paired wavelength $\lambda 9$ in the corresponding downstream FSR B3. In some examples, the 1G-PON OLT 50 transmits on wavelength $\lambda 5$ of the upstream FSR B2 of the cyclical AWG 200 and receives from the paired wavelength $\lambda 13$ in the corresponding upstream FSR B4. When the CO 40 includes more than one OLT 50, the signal of each OLT is multiplexed with the signals of the other OLTs (e.g., optical system 300 that includes multiplexer 310, 320) before sending it to the remote node 70.

In addition, FIG. 5A shows discrete OLT transceivers 50, which allow the TWDM system to piggyback onto a commercial G-PON OLT chassis. Therefore, to upgrade the network, an ISP switches the G-PON OLT transceivers with transceivers 50 designed at the custom wavelengths and inserts the multiplexers 310, 320 and amplifiers 330 (if needed). The discrete OLT transceivers 50 (as opposed to integrated array OLT transceivers used in a WDM-PON) allow for flexibility of using different protocols (e.g., 1 G-PON and 10 G-PON), where each protocol is on a different wavelength (see FIG. 5B).

Figure 5B:
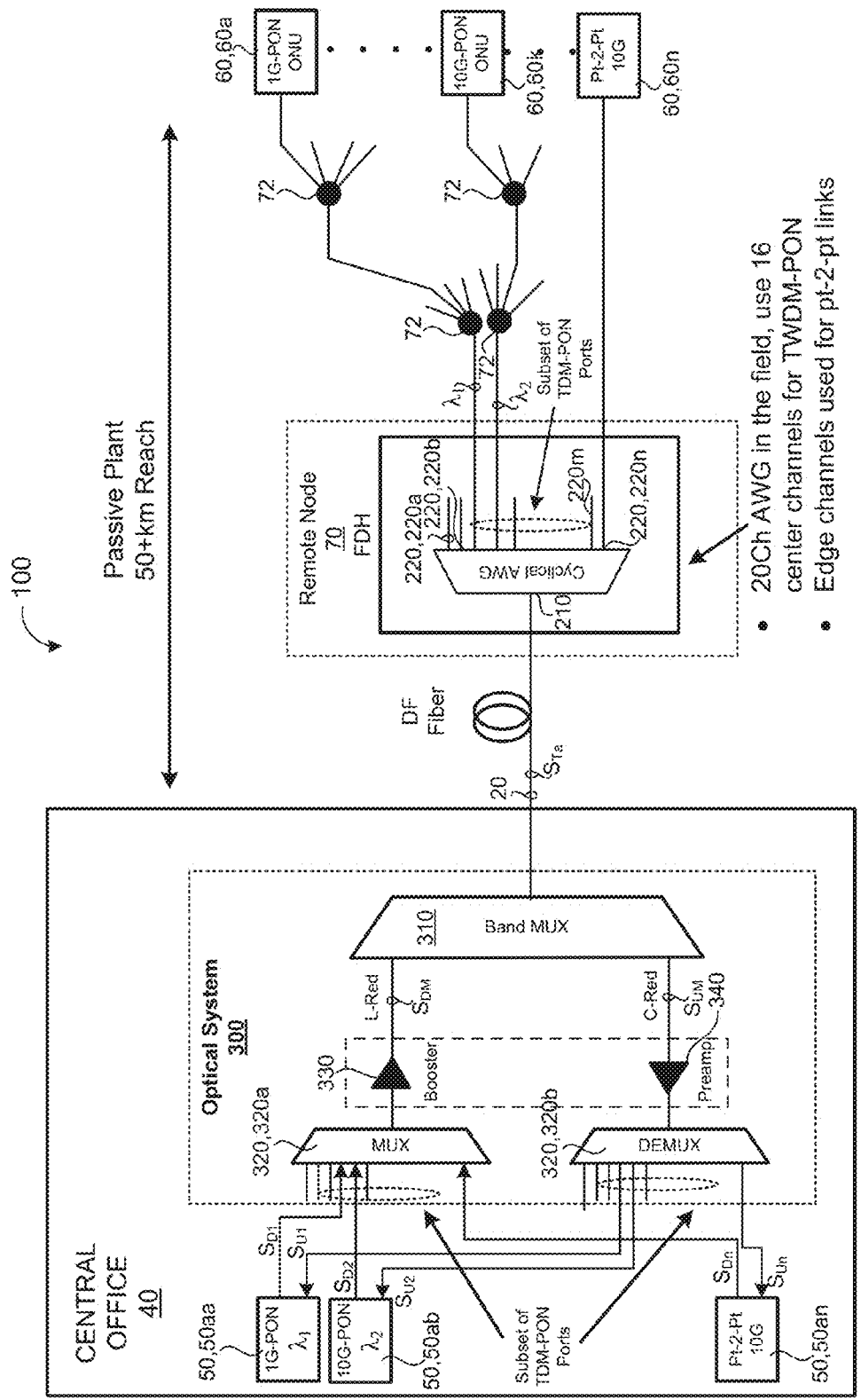

Referring to FIG. 5B, in some examples, wavelength $\lambda 1,1$ of the cyclical AWG 200 is used for 1G-PON protocol (OLTs 50aa), whereas wavelength $\lambda 2,1$ is used for 10G-PON protocols (OLTs 50ab). So the ONUs 60 hanging off power splitters 72 connected to $\lambda 1,1$ of the AWG output port 220 are all tunable 1G-PON-ONUs 60 and ONUs 60 connected to $\lambda 2,1$ of the AWG output port 220 are all tunable 10G-PON ONUs.

Referring back to FIGS. 5A and 5B, in some implementations, an optical system 300 includes duplex fibers for separate transmitting (downstream signals $S_DM$) and receiving connections (upstream signals $S_{UM}$), which is different than the conventional G-PON OLT transceivers having a single fiber interface with a built in diplexer that separates upstream and downstream signals within the OLT 50. The optical system 300 includes a band multiplexer 310, a downstream multiplexer 320a for multiplexing signals from the OLT 50 (in L-Red band), and a demultiplexer 320b for demultiplexing signals received from the ONUs 60 (in C-Red band). The band multiplexer 310 acts as a diplexer since it multiplexes the upstream OLT signals SDM (in C-Red band) and the downstream OLT signals $S_{UM}$ (in L-Red band) into one transmit signal ST signal. The design of the optical system 300 uses a downstream multiplexer 320a to multiplex downstream signals $S_{D1}$-$S_{Dn}$ from one or more or OLTs 50 into one downstream signal $S_{DM}$, and an upstream demultiplexer 320b for demultiplexing a multiplexed upstream signal $S_{UM}$ to one or more upstream signals $S_{U1}$-$S_{Un}$ to each OLT 50.

In some implementation, the optical system 300 may include a signal booster 330 and/or a signal preamplifier 340 in the downstream and upstream directions respectively. The signal booster 330 and/or the signal amplifier 340 may be an Erbium-Doped Fiber amplifier (EDFA). An EDFA is an optical repeater device that is used to boost the intensity of optical signals carried through feeder fiber. The EDFA signal booster 330 is optically connected with the downstream multiplexer 320a and the band multiplexer 310 and boosts the power of the multiplexed downstream signal $S_{DM}$ with a higher-power EDFA before entering into the long fiber feeder 20, or a device with large losses (e.g., power splitter) so it reaches the ONU 60. The EDFA signal amplifier 340 is optically connected with the upstream demultiplexer 320b and the band multiplexer 310 and boosts the power of the multiplexed upstream signal $S_{UM}$. The EDFA signal amplifier 340 is positioned so that the multiplexed upstream signal $S_{UM}$ is amplified when it arrives at the optical system 300 as a weak signal. Since the EDFA signal booster 330 boosts the multiplexed downstream signal $S_{DM}$ that includes the signals $S_{D1}$-$S_{Dn}$ from multiple OLTs 50, and the EDFA signal amplifier 340 amplifies the multiplexed upstream signal $S_{UM}$ that includes the signals $S_{U1}$-$S_{Un}$ to multiple OLTs 50, then the cost of each EDFA 330, 340 is shared among all the TWDM wavelengths λ, resulting in cost efficient upgraded TWDM-PON 100 architecture. In some examples, the optical system 300 as described extends the reach of the feeder fiber 20 from the CO 40 to a range of 50 kilometers using a 1:32 way splitter 72. For further reaches, another set of EDFAs 330, 340 may be placed at the RN 70. However, placing EDFAs 330, 340 at the RN 70 changes the RN 70 from a passive RN 70 to a powered RN 70.

The use of the EDFAs 330, 340 as part of the optical system 300 is optional and depends on the reach and size of the upgraded TWDM-PON 100. Moreover, the EDFAs relaxes the requirements of the OLT 50 and the ONU 60 transceivers, reducing the needed transmitter laser power and receiver sensitivity for both the ONU 60 and the OLT 50. With proper link designs, the shared-cost of the EDFAs improves transceiver yields and reduce the overall upgraded TWDM-PON 100 architecture costs.

In some implementations, the ONUs 60 of the network 100 include tunable transmitter lasers. In addition, one or more output ports 220 of the AWG 200 may be optically connected with a power splitter 72 for conveying an output signal from the AWG 200 to multiple ONUs 60. Connecting power splitters 72 to the AWG 200 provides the upgraded TWDM-PON 100 with lower overall loss than using power splitters alone to achieve the splitting ratio and thus increases the scalability of the upgraded TWDM-PON 100. As described, the ONU 60 may include a tunable laser; however, a non-tunable laser may also be used. Since each ONU 60 receives/transmits signals on a specific wavelength λ, a laser is used to transmit a signal on the correct wavelength. Thus, the ISP may use multiple ONUs each having a different laser to accommodate for the different wavelengths received.

In some implementations, the edge output ports 220a, 220b, 220m, 220n of the AWG 200 are connected to point to-point (pt-2-pt) WDM-PON transceivers at the ONUs 60. Since the upgraded TWDM-PON 100 is configured to use discrete transceivers at the CO 40, the transceivers 50 may be pt-2-pt WDM or TDM transceivers due to the ease of mixing wavelength specific TDM-PONs with pt-2-pt WDM-PONs on the same fiber plant 20. In some examples, the upgraded TWDM-PON 100 may include 20 wavelengths. The ISP may reserve the center 16 wavelengths for TDM-PONs and the four edge wavelength channels, two each end of the AWG for pt-2-pt pure WDM transmissions (i.e., edge output ports 220a, 220b, 220m, 220n). The edge channels of an AWG 200 (i.e., edge output ports 220a, 220b, 220m, 220n) usually suffer from higher loss. Therefore, these channels (i.e., edge output ports 220a, 220b, 220m, 220n) are used for pt-2-pt connections, which do not go through lossy power splitters 72 (causing more power loss). The pt-2-pt WDM-PON channels may be used to carry premium services such as 10 Gbps enterprise network connections that require guaranteed bandwidths.

As previously described, to upgrade or increase the upgraded TWDM-PON 100 capacity, it is often desirable to overlay multiple services or platforms on the same fiber 20. For example, in the TWDM-PON architecture 100, overlaying multiple services is achieved by using a different pair of wavelengths (one for upstream and one for downstream) for each platform that is overlaid as described with respect to FIG. 3D. As shown, the ISP leverages the repeating FSRs B1-B4 of the cyclical AWG 200 to update or expand the upgraded TWDM-PON 100. Referring back to FIG. 3D, four FSRs B1-B4 are shown, the upgraded TWDM-PON 100 may use the first FSR B1 (upstream FSR) and the third FSR B3 (downstream FSR) for the existing service(s), and the second FSR B2 (upstream FSR) and the fourth FSR B4 (downstream FSR) for the upgraded or expansion service(s). Or the upgraded TWDM-PON 100 may use the second FSR B2 (upstream FSR) and the fourth FSR B4 (downstream FSR) for the existing service(s), and the first FSR B1 (upstream FSR) and the third FSR B3 (downstream FSR) for the upgraded or expansion service(s). The FSRs B1-B4 are interleaved so that the upstream and downstream wavelengths are separated from each other, which eases the diplexer design inside the ONUS 60. Each ONU receiver (of the transceiver) is equipped with a band filter to select the desirable FSR B1-B4 for the particular service of interests. Therefore, there is no need for a tunable receiver at the ONU 60.

Figure 5D:
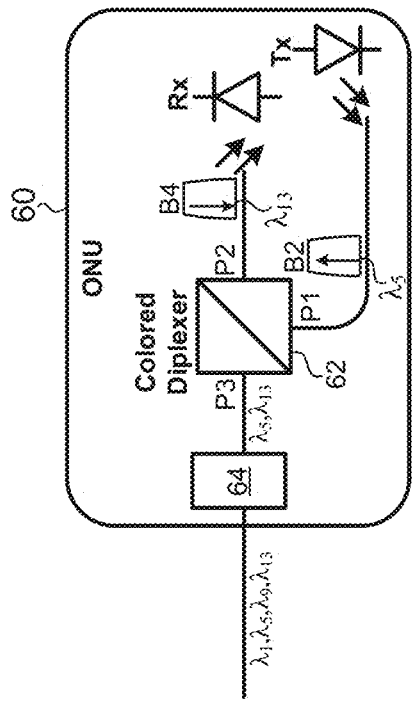
FIGS. 5C and 5D are schematic views of example ONUs used in the TWDM-PON architecture of FIGS. 5A and 5B.
Figure 5C:
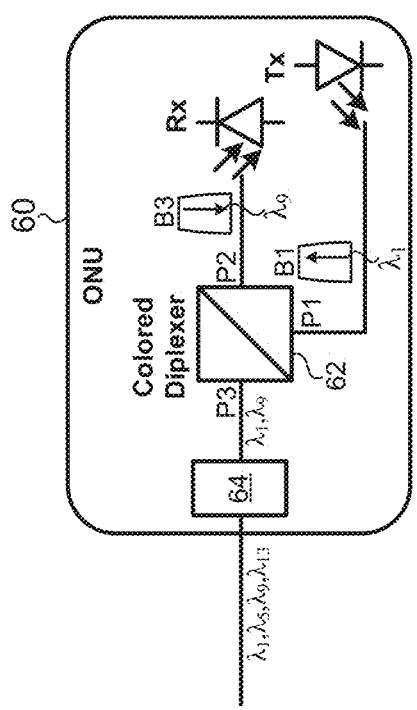

Referring to FIGS. 5C and 5D, each ONU 60 includes a diplexer 62, which multiplexes first and second ports P1, P2 of the diplexer into a third port P3. The signals on the first and second ports P1, P2 occupy disjoint frequency bands, i.e., are on different FSRs B1-B4; therefore, the signals on the first and second ports P1, P2 can coexist on the third port P3. Therefore, the two shorter wavelength bands FSR B1 and FSR B2 are used for uplink and the two longer wavelength bands FSR B3 and FSR B4 are used for downlink. This relaxes the requirements of the colored diplexer in the ONU 60. Moreover, each ONU 60 includes the band-pass filter 64 before the diplexer 62 to remove unwanted downlink channels from OLTs 50 for other services. The fixed band-pass filter 64 passes frequencies or wavelengths λ within a certain range and rejects (i.e., attenuates) frequencies or wavelengths λ outside that range. Therefore, each band-pass filter 64 passes the desired wavelengths λ associated with the desired service. In some implementations, the diplexer 62 inside each ONU 60 also serves as the band-pass filter 64 before the receiver Rx to remove unwanted downlink channels from OLTs 50 for other services. FIG. 5C shows an example ONU 60 that is configured to receive/transmit signals on the first and third FSRs B1, B3. While FIG. 5D shows an example ONU 60 configured to receive/transmit signals on the second and fourth FSRs B2, B4.

Referring back to FIGS. 5A and 5B, the system 100 may include one or more optical splitters 72 in communication with each output 220 of the AWG 200. The optical splitter 72 further expands the network 100. Each optical splitter 72 conveys the signal outputted from each port 220 of the AWG 200 to the ONUs 60. For example, the first signal having wavelength $\lambda_1$ outputted from the first non-edge port 220c of the AWG 200 is split by the power splitter 72, then the first signal having wavelength $\lambda_1$ is conveyed to the ONUs 60 that are optically connected with the splitter 72 transmitting the first signal having wavelength $\lambda_1$. In this case, the first ONU 60a, which is an ONU using the G-PON MAC 60a receives the outputted signal having wavelength $\lambda_1$ that is transmitted from the first OLT 50aa. The second ONU 60k may be an ONU using the G-PON MAC 60k (as shown in FIG. 5A) or a 10G-PON ONU 60a (as shown in FIG. 5B) and receive/transmit a signal having wavelength $\lambda_2$ from/to the second OLT 50ab, which is an OLT using the G-PON MAC (as shown in FIG. 5A) or a 10G-PON OLT (as shown in FIG. 5B). Each ONU 60a, 60k includes the band-pass filter 64 (FIGS. 5C and 5D) that filters the wavelengths that the ONU 60 may receive.

Figure 6A:
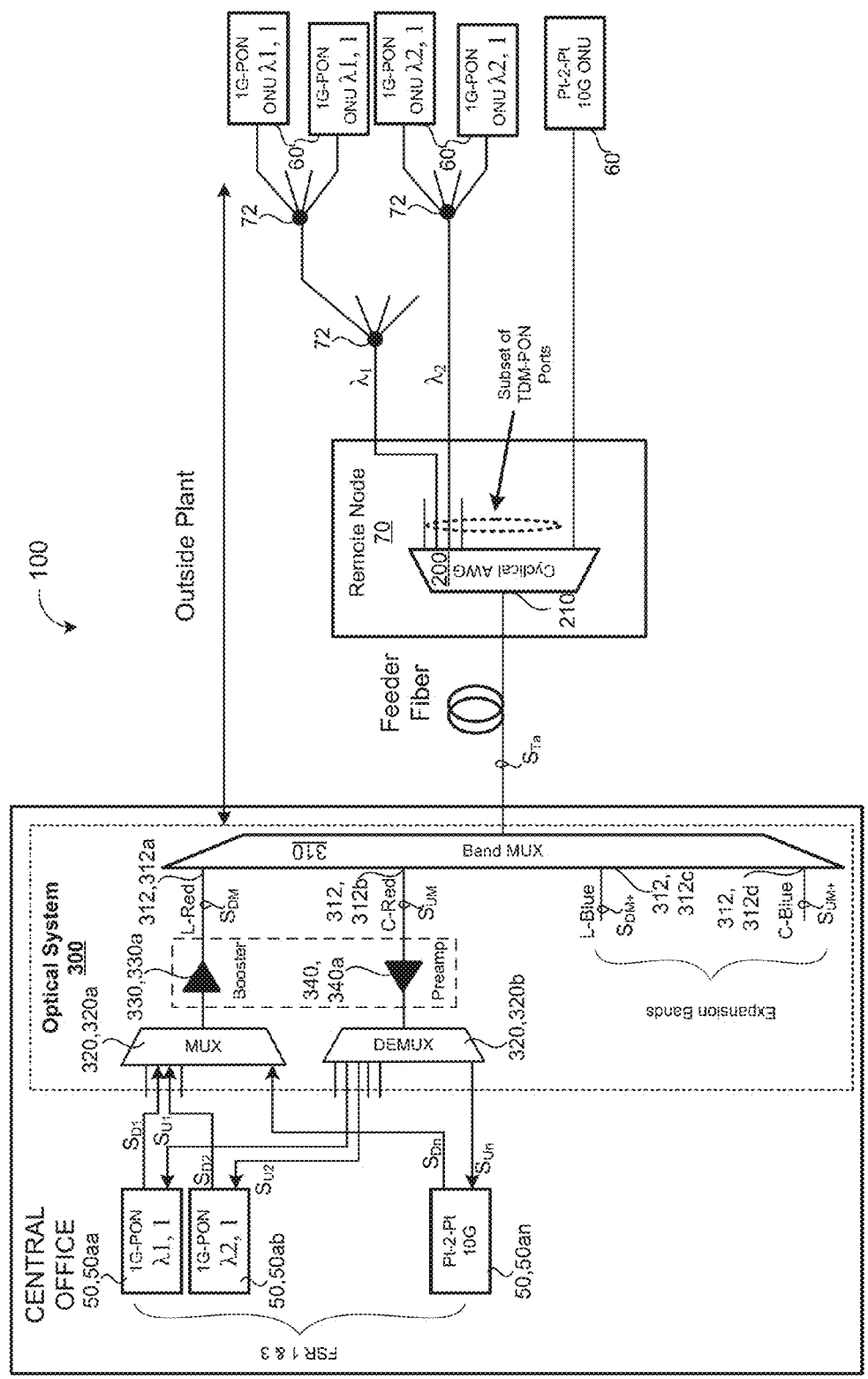
FIGS. 6A and 6B are schematic views of an example TWDM-PON architecture configured to be upgraded/expanded.
Figure 6B:
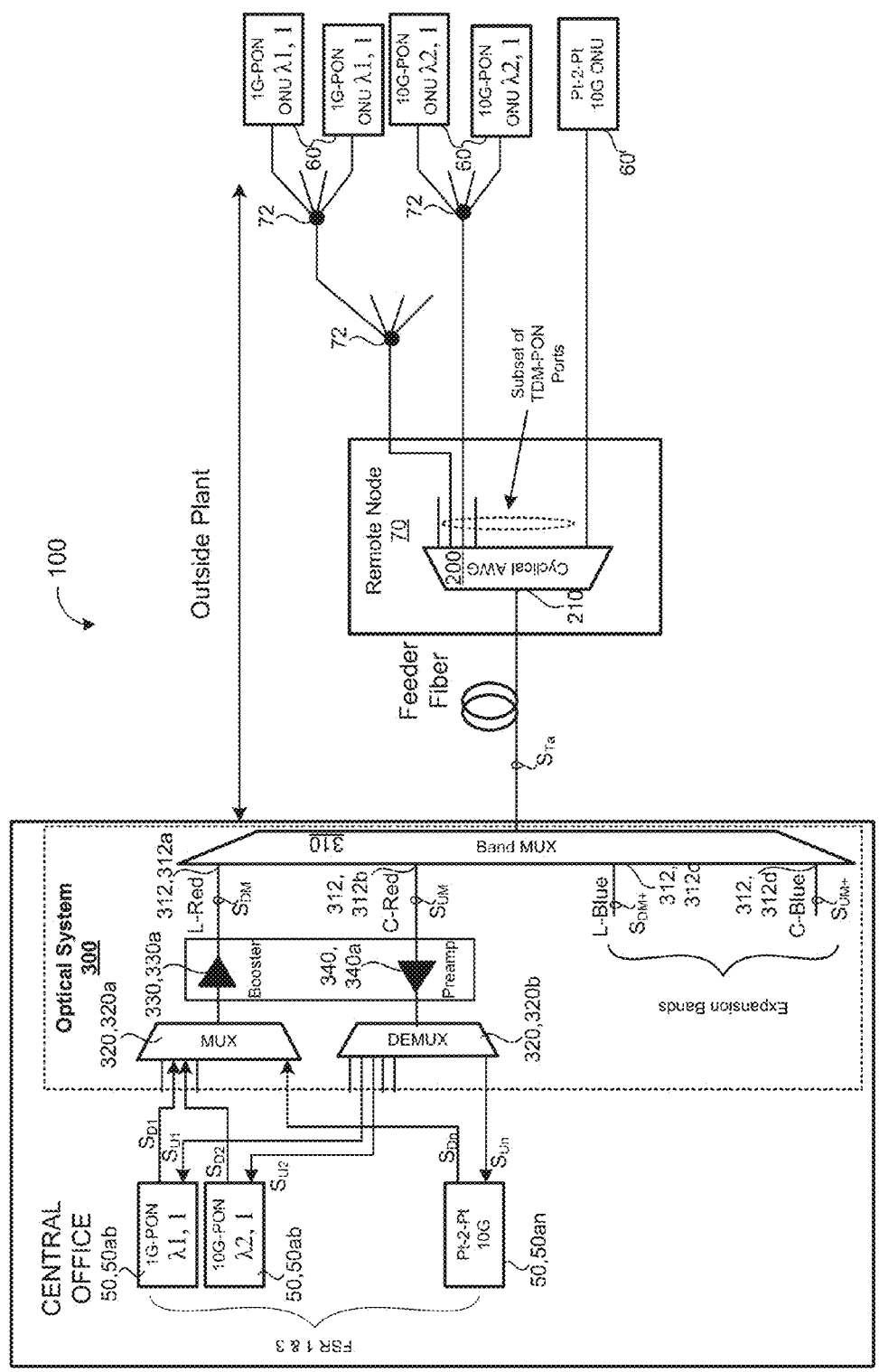

Referring to FIGS. 6A and 6B, to upgrade or increase the capacity of the upgraded TWDM-PON architecture 100, the band multiplexer 310 including four ports 312a, 312b, 312c, 312d and using the first port 312a and the second port 312b, expands the use of its third port 312c and fourth port 312d. Wavelength $\lambda_{n,m}$ represents the $n^{th}$ wavelength of FSR m of the AWG port 220. For example, wavelength $\lambda_{1,1}$ represents the first wavelength $\lambda_1$ of the first FSR B1 for upstreaming (or third FSR B3 for downstreaming). Wavelength $\lambda_{2,1}$ represents the second wavelength $\lambda_2$ of the first FSR B1 for upstreaming (or third FSR B3 for downstreaming). FIG. 6A shows a TWDM network 100 similar to FIG. 5A with two OLTs using the G-PON MAC 50aa, 50ab; while FIG. 6B shows a TWDM network 100 similar to FIG. 5B with an OLT using the G-PON MAC 50aa and a 10G-PON OLT 50ab.

Figure 7:
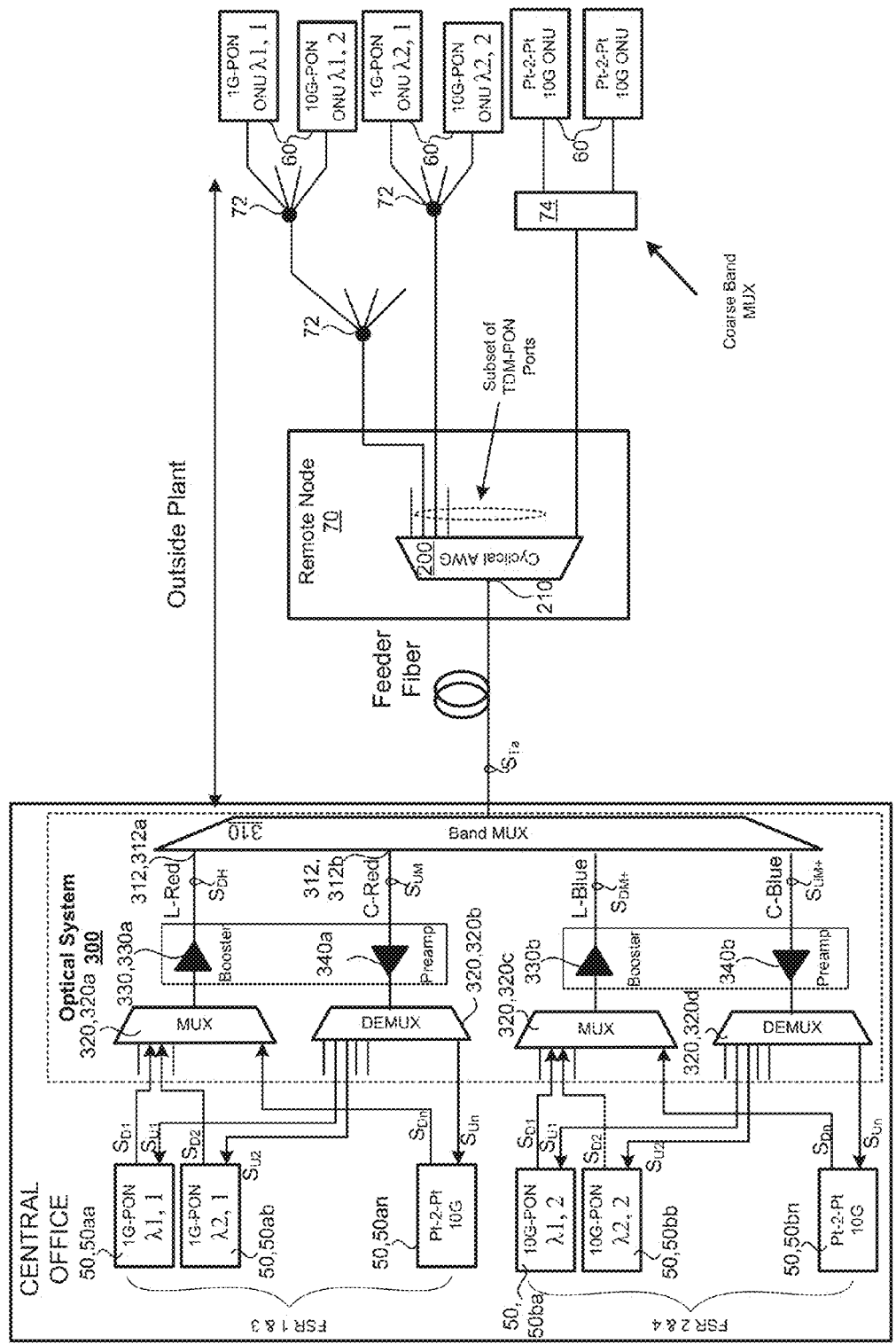
FIG. 7 is a schematic view of an example expanded/upgraded TWDM-PON architecture.

Referring to FIG. 7, to upgrade/expand the upgraded TWDM-PON 100 the ISP overlays the new upgraded or expanded OLTs 50, 50ba-50bn on the expansion FSRs B2, B4 first. Then the end users 30 may swap their legacy ONUs 60 with upgraded ONUs 60 configured to receive the updated signals from the expansion FSRs B2, B4. After all the legacy ONUs 60 have been swapped out with the new upgraded ONUs 60, the legacy OLTs 50, 50aa-50an may be decommissioned, making the FSRs they originally occupy (e.g., FSR B1 and FSR B2) available for upgrading to yet newer services. As shown, the legacy system uses FSRs B1 and B3 and the expanded or upgraded system uses FSRs B2 and B4; however, the legacy system may use FSRs B2 and B4 and the expanded or upgraded system uses FSRs B1 and B3.

The optical system 300 of FIG. 7 additionally includes a downstream multiplexer 320c for multiplexing signals from the OLT 50 (in L-Blue band), and a demultiplexer 320d for demultiplexing signals received from the ONUS 60 (in C-Blue band). The band multiplexer 310 multiplexes the upstream OLT signals $S_{UM}$ (in C-Red band and C-Blue band) and the downstream OLT signals $S_{DM}$ (in L-Red band and L-Blue band) into one transmit signal $S_T$ signal. The design of the optical system 300 uses a downstream multiplexer 320c to multiplex downstream signals $S_{D1}$-$S_{Dn}$ from one or more OLTs 50ba-50bn into one downstream signal SDM, and an upstream demultiplexer 320d for demultiplexing a multiplexed upstream signal SUM to one or more upstream signals $S_{U1}$-$S_{Un}$ to each OLT 50ba-50bn.

In some implementation, the optical system 300 may include a second signal booster 330b and/or a second signal preamplifier 340b in the downstream and upstream directions respectively in addition to the first signal booster 330a and/or a first signal preamplifier 340a, similar to the ones described above. The use of the EDFAs 330b, 340b as part of the optical system 300 is optional and depends on the reach and size of the upgraded TWDM-PON 100.

In some implementations, the additional pair of FSRs B2, B4 allows two upgraded services to co-exist over the same fiber plant 20, 10G-PON and 100G pt-2pt, for example. As shown, 1G-PON and 10G pt-2-pt services are serviced through the first and third FSRs B1, B3 of the cyclical AWG 200 whereas 10G-PON and 100G pt-2-pt services are serviced through second and fourth FSRs B2, B4 of the cyclical AWG 200. With this design, each splitter may be connected to a 1G-PON ONU or 10G-PON ONU, and each pt-2-pt link can be either a 10G link or 100G link. The ONUs 60 use tunable lasers with the right tuning range for upstream transmission and built in band filters in front of receivers to select the correct service wavelengths. The service each user receives is therefore controlled completely by the ONU hardware. WDM band mux filters 74 are used to separate pt-2-pt services overlaid on the same AWG output port.

Figure 8A:
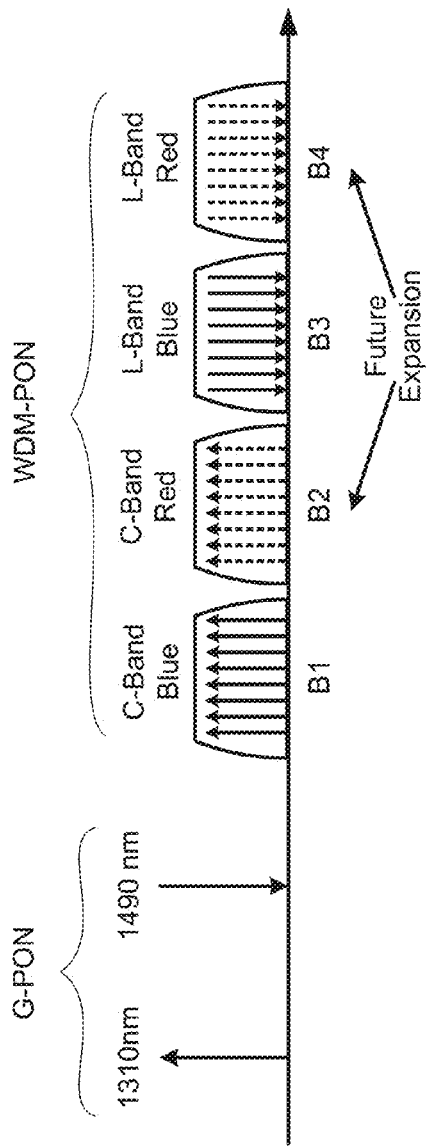
FIGS. 8A and 8B are schematic views of example spectrum allocations for the expanded/upgraded TWDM-PON architecture.
Figure 8B:
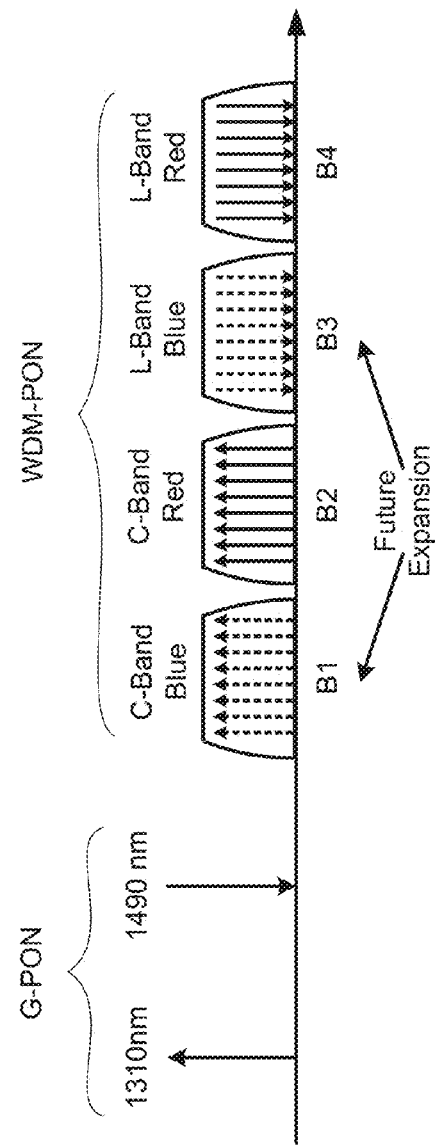

Referring to FIGS. 8A and 8B, in some implementations, the upgraded TWDM-PON 100 uses the C-band and L-band for upstream and downstream transmissions respectively. Each of the C-band and L-band is further segregated into two FSRs B1-B4, Blue (short wavelengths) and Red (long wavelengths). The number of wavelengths in each FSR depends on the channel spacing. For 100 GHz spaced wavelengths, each FSR can support roughly 20 wavelengths. In some examples, the legacy OLTs 50aa-50an using FSR B1 and B3 use the short wavelengths (i.e., blue) of each of the C-band and L-band (FIG. 8A). However, in other examples, and as shown in FIG. 8B, the legacy OLTs 50aa use the long wavelength (i.e., red) and the expanded or updated system uses the short wavelength (i.e., blue). C-band and L-band wavelengths for the WDM-PON and TWDM-PON provide for the lowest loss of glass fiber, thus providing for the longer distances of transmission and use of lower power transmissions. Moreover, C-band and L-band are easily amplified EDFAs, which are the most mature fiber optic technology. This allows implementation with longer transmission distances and super-sized COs. Moreover, since DWDM eco system already exists in the C-band and L-band, and it is easy to get WDM and tunable lasers in C-band and L-band.

Referring to FIGS. 9A and 9B that show a comparison of the current TDM architecture and the upgraded TWDM architecture 100, the system of FIG. 9A shows branches of fiber cables in a typical fiber plant. The size of the fiber bundle becomes smaller and smaller as fiber gets closer and closer to end user ONUs 60. This figure represents that larger-size conduits are used for thicker cables, which are closer to the CO 40. In contrast, small size conduits are used for the upgraded TWDM-PON 100. In fact, a standard one size conduit may be used for all the construction, simplifying the upgraded TWDM-PON 100 design.

The upgraded TWDM-PON 100 design allows for the use of fewer COs 40 since each CO 40 can serve more ONUs. Thus, the centralization of the COs 40 simplifies the upgraded TWDM-PON 100 operation and saves recurring operating costs as fewer active COs and hence less staff is required to manage and operate the network.

From the CO to the end users 30, the fiber cables 20, 22 go through branches to serve different areas. As illustrated in FIG. 9A, a typical network starts with a very wide trunk and the branches 22 become thinner and thinner, which also reduces the required conduit size. Larger conduits are slower and more expensive to construct than thinner conduits. In fact, the reduction in the size of the feeder fiber 20, 22 is significant enough that a single size conduit could be used throughout the upgraded TWDM-PON 100 from the CO 40 to end users 30. This not only reduces the cost and time of fiber plant 20, 22 construction, but also simplifies upgraded TWDM-PON 100 design (so that only route design is needed and there is no need to worry about conduit size). The speed of network design and the permitting process could also be improved.

Figure 10:
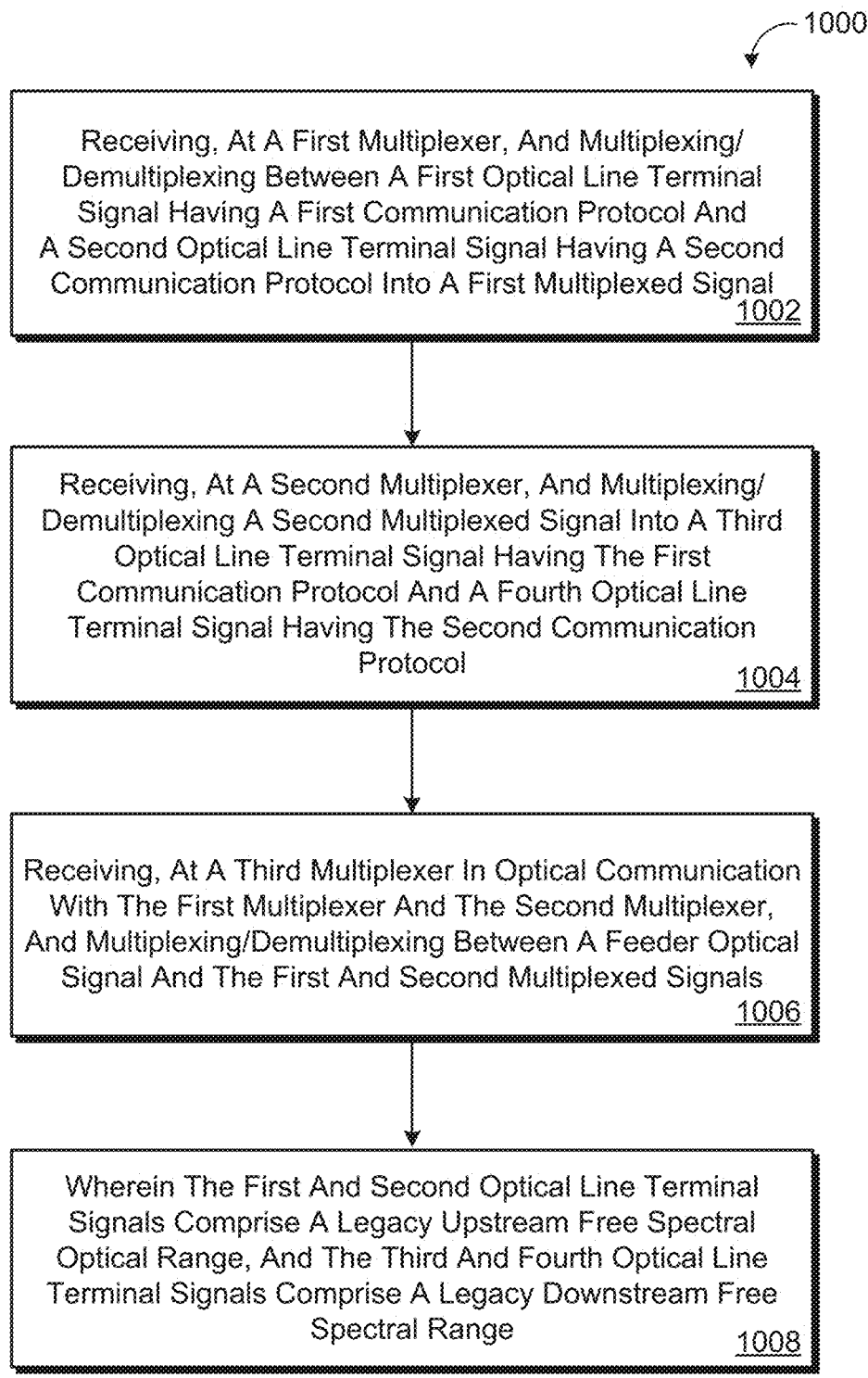
FIG. 10 is an example arrangement of operations for a method of upgrading/expanding a legacy network.

Referring to FIG. 10, a method 1000 for upgrading/expanding an upgraded TWDM network 100 (as described in FIGS. 4-8 and 9B) includes at block 1002, receiving, at a first multiplexer (MUX) 320a, and multiplexing/demultiplexing between: a first multiplexed signal $S_{DM}$; and a first optical line terminal signal $S_{D1}$ having a first multiplexing group (TDM-PON) and a second optical line terminal signal $S_{Dn}$ having a second multiplexing group (pt-2-pt). At block 1004, the method 1000 includes receiving, at a second multiplexer 320b, and multiplexing/demultiplexing between: a second multiplexed signal $S_{UM}$; and a third optical line terminal signal $S_{U1}$ having the first multiplexing group (TDM-PON) and a fourth optical line terminal signal $S_{U2}$ having the second multiplexing group (pt-2-pt). At block 1006, the method 1000 includes receiving, at a third multiplexer 310 (e.g., BAND MUX) optically connected with the first multiplexer 320a and the second multiplexer 320b, and multiplexing/demultiplexing between: a feeder optical signal $S_{Ta}$; and the first and second multiplexed signals $S_{DM}$, $S_{UM}$. The first optical line terminal signal $S_{D1}$ (TDM-PON, $\lambda_1$) and the second optical line terminal signal $S_{Dn}$ (pt-2-pt) each includes a wavelength in a legacy downstream free spectral range FSR B3 or FSR B4, and the third and fourth optical line terminal signals $S_{U1}$, $S_{U2}$ each include a wavelength in a legacy upstream free spectral range FSR B1 or FSR B2.

The method 1000 may further include amplifying, at a first amplifier 330a optically connected with the first multiplexer 320a and the third multiplexer 310 (BAND MUX), the first multiplexed signal $S_{DM}$; or amplifying, at a second amplifier 340b optically connected with the second multiplexer 320b and the third multiplexer 310 (BAND MUX), the second multiplexed signal S.

In some examples, the first multiplexing group includes a TDM-PON protocol and the second multiplexing group (pt-2-pt) includes a WDM-PON protocol. The first optical line terminal signal $S_{D1}$ and the third optical line terminal signal $S_{U1}$ may each have a first protocol (TDM-PON, $\lambda_1$ e.g., 1G-PON), and the second optical line terminal signal $S_{Dn}$ and the fourth optical line terminal signal $S_{Un}$ may each have a second protocol (10G pt-2-pt) different from the first protocol.

In some implementations, the method 1000 further includes receiving, at the first multiplexer 320a (MUX), and multiplexing/demultiplexing between: the first multiplexed signal $S_{Dm}$; and a fifth optical line terminal signal $S_{D2}$ (TDM-PON, $\lambda_{2,1}$), the first optical line terminal signal $S_{D1}$ (TDM-PON, $\lambda_{1,1}$), and the second optical line terminal signal $S_{Dn}$ (pt-2-pt). The first optical line terminal signal $S_{D1}$ has a first protocol (TDM-PON, $\lambda_{1,1}$, e.g., 1G-PON), and the fifth optical line terminal signal $S_{D2}$ (TDM-PON$_1$) has the first multiplexing group (TDM-PON) and a second protocol (TDM-PON $\lambda_{2,1}$, e.g., 10G-PON) different from the first protocol (TDM-PON, $\lambda_{1,1}$, e.g., 1G-PON). The method 1000 also includes receiving, at the second multiplexer 320b, and multiplexing/demultiplexing between: the second multiplexed signal $S_{UM}$; and the second optical line terminal signal $S_{DN}$, the fourth optical line terminal signal $S_{U2}$ (pt-2-pt), and a sixth optical line terminal signal $S_{U2}$ (TDM-PON). The sixth optical line terminal signal $S_{U2}$ has the first multiplexing group (TDM-PON) and the second protocol (TDM-PON $\lambda_{2,1}$), as shown in FIG. 6B.

The method 1000 may also include transmitting, by way of a feeder optical fiber 20 optically connected with the third multiplexer 310 (BAND MUX), the feeder optical signal $S_{Ta}$. The method 1000 also includes receiving, at an AWG 200 optically connected with the feeder optical fiber 20, and multiplexing/demultiplexing between the feeder optical signal $S_{Ta}$ and optical network unit signals $50_1$-$50_n$. Each optical network unit signal $50_1$-$50_n$ includes an upstream wavelength in the legacy upstream free spectral range FSR 1 or FSR 2 and a downstream wavelength in the legacy downstream free spectral range FSR 3 or FSR 4.

Referring additionally to FIG. 7, in some implementations, the method 1000 includes receiving, at a fourth multiplexer 320c (MUX) optically connected with the third multiplexer 310, and multiplexing/demultiplexing between: a third multiplexed signal $S_{Dm}$; and a fifth optical line terminal signal $S_{D1}$ having the first multiplexing group (TDM-PON) and a sixth optical line terminal signal $S_{Dn}$ having the second multiplexing group (pt-2-pt). The method 1000 also includes receiving, at a fifth multiplexer 320d optically connected with the third multiplexer 310, and multiplexing/demultiplexing between: a fourth multiplexed signal $S_{Um}$; and a seventh optical line terminal signal $S_{U1}$ having the first multiplexing group (TDM-PON) and an eighth optical line terminal signal $S_{Um}$ having the second multiplexing group (pt-2-pt). The fifth optical line terminal signal $S_{D2}$ and the sixth optical line terminal signal $S_{Dn}$ each has wavelengths in an upgrade upstream free spectral range FSR 1 or FSR 2, and the seventh (TDM-PON) and eight optical line terminal signals $S_{U1}$, $S_{Um}$ (pt-2-pt) each have wavelengths in an upgrade downstream free spectral range FSR 3 or FSR 4. The method 1000 may further include transmitting, by way of a feeder optical fiber 20 optically connected with the third multiplexer 310 (BAND MUX), the feeder optical signal $S_T$a. The method 1000 also includes receiving, at an AWG 200 optically connected with the feeder optical fiber 20, and multiplexing/demultiplex between the feeder optical signal $S_{Ta}$ and optical network unit signals $50_1$-$50_n$. Each optical network unit signal $50_1$-$50_n$ includes a legacy upstream wavelength in the legacy upstream free spectral range FSR 1 or FSR 2, a legacy downstream wavelength in the legacy downstream free spectral range FSR 3 or FSR 4, an upgrade upstream wavelength in the upgrade upstream free spectral range, and an upgrade second downstream wavelength in the upgrade downstream free spectral range.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication system comprising:
 a central office comprising:
  a first multiplexer configured to multiplex a first optical line terminal signal having a time-division-multiplexing passive optical network protocol and a second optical line terminal signal having a wavelength-division-multiplexing passive optical network protocol into a first multiplexed signal;
  a second multiplexer configured to demultiplex a second multiplexed signal into a third optical line terminal signal having the time-division-multiplexing passive optical network protocol and a fourth optical line terminal signal having the wavelength-division-multiplexing passive optical network protocol;
  a third multiplexer optically connected with the first multiplexer and the second multiplexer, the third multiplexer configured to multiplex/demultiplex between a feeder optical signal and the first and second multiplexed signals;
  a fourth multiplexer optically connected with the third multiplexer and configured to multiplex a fifth optical line terminal having the time-division-multiplexing passive optical network protocol and a sixth optical line terminal signal having the wavelengthdivision-multiplexing passive optical network protocol into a third multiplexed signal; and
a fifth multiplexer optically connected with the third multiplexer and configured to demultiplex a fourth multiplexed signal into a seventh optical line terminal signal having the time-division-multiplexing passive optical network protocol and an eighth optical line terminal signal having the wavelength-division-multiplexing passive optical network protocol;
a feeder optical fiber optically connected with the third multiplexer and arranged to convey the feeder optical signal; and
an arrayed waveguide grating optically connected with the feeder optical fiber and configured to multiplex/demultiplex between the feeder optical signal and optical network unit signals, each optical network unit signal comprising a legacy upstream wavelength in a legacy upstream free spectral range, a legacy downstream wavelength in a legacy downstream free spectral range, an upgrade upstream wavelength in an upgrade upstream free spectral range, and an upgrade downstream wavelength in an upgrade downstream free spectral range,
wherein each of the first and second optical line terminal signals comprises the legacy downstream wavelength in the legacy downstream free spectral range, each of the third and fourth optical line terminal signals comprises the legacy upstream wavelength in the legacy upstream free spectral range, each of the fifth and sixth optical line terminal signals comprises the upgrade downstream wavelength in the upgrade downstream free spectral range, and each of the seventh and eighth optical line terminal signals comprises the upgrade upstream wavelength in the upgrade upstream free spectral range.

2. The system of claim 1, further comprising at least one of:
a first amplifier optically connected with the first multiplexer and the third multiplexer and configured to optically amplify the first multiplexed signal; or
a second amplifier optically connected with the second multiplexer and the third multiplexer and configured to optically amplify the second multiplexed signal.

3. The system of claim 1, wherein the first optical line terminal signal and the third optical line terminal signals each have a first protocol, and the second optical line terminal signal and the fourth optical line terminal signal each have a second protocol different from the first protocol.

4. The system of claim 1, further comprising:
a first optical line terminal having an output optically connected with the first multiplexer and an input optically connected with the second multiplexer, the first optical line terminal transmitting the first optical line terminal signal and receiving the third optical line terminal signal; and
a second optical line terminal having an output optically connected with the first multiplexer and an input optically connected with the second multiplexer, the second optical line terminal transmitting the second optical line terminal signal and receiving the fourth optical line terminal signal.

5. The system of claim 1, wherein:
the first multiplexer is further configured to multiplex a ninth optical line terminal signal with the first and second optical line terminal signals into the first multiplexed signal, the first optical line terminal signal having a first protocol, the ninth optical line terminal signal having the time-division-multiplexing passive optical network protocol and a second protocol different from the first protocol; and
the second multiplexer is further configured to demultiplex the second multiplexed signal into the second optical line terminal signal, the fourth optical line terminal signal, and a tenth optical line terminal signal, the tenth optical line terminal signal having the time-division-multiplexing passive optical network protocol and the second protocol.

6. The system of claim 5, further comprising a third optical line terminal having an output optically connected with the first multiplexer and an input optically connected with the second multiplexer, the third optical line terminal transmitting the ninth optical line terminal signal and receiving the tenth optical line terminal signal.

7. The system of claim 1, further comprising at least one of:
a third amplifier optically connected with the fourth multiplexer and the third multiplexer and configured to optically amplify the third multiplexed signal; or
a fourth amplifier optically connected with the fifth multiplexer and the third multiplexer and configured to optically amplify the fourth multiplexed signal.

8. The system of claim 7, further comprising
a third optical line terminal having an output in communication with the fourth multiplexer and an input in communication with the fifth multiplexer, the third optical line terminal transmitting the fifth optical line terminal signal and receiving the seventh optical line terminal signal; and
a fourth optical line terminal having an output in communication with the fourth multiplexer and an input in communication with the fifth multiplexer, the fourth optical line terminal transmitting the sixth optical line terminal signal and receiving the eighth optical line terminal signal.

9. A method comprising:
receiving, at a first multiplexer of a central office, and multiplexing/demultiplexing between:
a first multiplexed signal; and
a first optical line terminal signal having a time-division-multiplexing passive optical network protocol and a second optical line terminal signal having a wavelength-division-multiplexing passive optical network protocol;
receiving, at a second multiplexer of the central office, and multiplexing/demultiplexing between:
a second multiplexed signal; and
a third optical line terminal signal having the time-division-multiplexing passive optical network protocol and a fourth optical line terminal signal having the wavelength-division-multiplexing passive optical network protocol;
receiving, at a third multiplexer optically connected with the first multiplexer and the second multiplexer, and multiplexing/demultiplexing between:
a feeder optical signal; and
the first and second multiplexed signals,
receiving, at a fourth multiplexer of the central office optically connected with the third multiplexer, and multiplexing/demultiplexing between:
a third multiplexed signal; and
a fifth optical line terminal having the time-division-multiplexing passive optical network protocol and a sixth optical line terminal signal having the wavelength-division-multiplexing passive optical network protocol;

receiving, at a fifth multiplexer of the central office optically connected with the third multiplexer, and multiplexing/demultiplexing between:
- a fourth multiplexed signal; and
- a seventh optical line terminal signal having the time-division-multiplexing passive optical network protocol and an eighth optical line terminal signal having the wavelength-division-multiplexing passive optical network protocol;

transmitting, by way of a feeder optical fiber optically connected with the third multiplexer, the feeder optical signal; and receiving, at an arrayed waveguide grating optically connected with the feeder optical fiber, and multiplexing/demultiplex between the feeder optical signal and optical network unit signals, each optical network unit signal comprising a legacy upstream wavelength in the legacy upstream free spectral range, a legacy downstream wavelength in the legacy downstream free spectral range, an upgrade upstream wavelength in the upgrade upstream free spectral range, and an upgrade downstream wavelength in the upgrade downstream free spectral range, wherein each of the first and second optical line terminal signals comprises the legacy downstream wavelength in the legacy downstream free spectral range, each of the third and fourth optical line terminal signals comprises the legacy upstream wavelength in the legacy upstream free spectral range, each of the fifth and sixth optical line terminal signals comprises the upgrade downstream wavelength in the upgrade downstream free spectral range, and each of the seventh and eighth optical line terminal signals comprises the upgrade upstream wavelength in the upgrade upstream free spectral range.

10. The method of claim 9, further comprising:
amplifying, at a first amplifier optically connected with the first multiplexer and the third multiplexer, the first multiplexed signal; or
amplifying, at a second amplifier optically connected with the second multiplexer and the third multiplexer, the second multiplexed signal.

11. The method of claim 9, wherein the first optical line terminal signal and the third optical line terminal signals each have a first protocol, and the second optical line terminal signal and the fourth optical line terminal signal each have a second protocol different from the first protocol.

12. The method of claim 9, further comprising:
receiving, at the first multiplexer, and multiplexing/demultiplexing between:
  the first multiplexed signal; and
  a ninth optical line terminal signal, the first optical line terminal signal, and the second optical line terminal signal,
  wherein the first optical line terminal signal has a first protocol, and the ninth optical line terminal signal has the time-division-multiplexing passive optical network protocol and a second protocol different from the first protocol; and
receiving, at the second multiplexer, and multiplexing/demultiplexing between:
  the second multiplexed signal; and
  the second optical line terminal signal, the fourth optical line terminal signal, and a tenth optical line terminal signal,
  wherein the tenth optical line terminal signal has the time-division-multiplexing passive optical network protocol and the second protocol.

* * * * *